(12) United States Patent
Nakamura et al.

(10) Patent No.: US 8,300,692 B2
(45) Date of Patent: Oct. 30, 2012

(54) MOVING PICTURE CODING METHOD, MOVING PICTURE DECODING METHOD, MOVING PICTURE CODING DEVICE, AND MOVING PICTURE DECODING DEVICE

(75) Inventors: Tsuyoshi Nakamura, Fukuoka (JP); Ikuo Fuchigami, Fukuoka (JP); Masao Hamada, Fukuoka (JP); Tadanori Tezuka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1090 days.

(21) Appl. No.: 12/043,313

(22) Filed: Mar. 6, 2008

(65) Prior Publication Data

US 2008/0219347 A1 Sep. 11, 2008

(30) Foreign Application Priority Data

Mar. 7, 2007 (JP) ................................ 2007-056993

(51) Int. Cl.
*H04N 11/02* (2006.01)
(52) U.S. Cl. ............................... 375/240.12; 375/240.24
(58) Field of Classification Search ............. 375/240.12, 375/240.24, E7.11, E7.145
See application file for complete search history.

(56) References Cited

U.S. PATENT DOCUMENTS

| | | | |
|---|---|---|---|
| 5,734,783 A | 3/1998 | Shimoda et al. | |
| 5,751,893 A | 5/1998 | Shimoda et al. | |
| 5,862,295 A | 1/1999 | Shimoda et al. | |
| 6,002,440 A | 12/1999 | Dalby et al. | |
| 6,009,230 A | 12/1999 | Shimoda et al. | |
| 6,038,371 A | 3/2000 | Shimoda et al. | |
| 2004/0008766 A1* | 1/2004 | Wang et al. | 375/240.01 |
| 2005/0008240 A1* | 1/2005 | Banerji et al. | 382/238 |
| 2007/0025444 A1* | 2/2007 | Okada et al. | 375/240.16 |
| 2007/0086528 A1* | 4/2007 | Mauchly et al. | 375/240.24 |
| 2007/0140348 A1 | 6/2007 | Koto et al. | |
| 2008/0151997 A1* | 6/2008 | Oguz | 375/240.02 |
| 2008/0170793 A1* | 7/2008 | Yamada et al. | 382/232 |

FOREIGN PATENT DOCUMENTS

| | | |
|---|---|---|
| JP | 05-276491 | 10/1993 |
| JP | 2001-054065 | 2/2001 |
| JP | 2001-509329 | 7/2001 |
| JP | 2003-299103 | 10/2003 |
| JP | 2004-128952 | 4/2004 |

* cited by examiner

*Primary Examiner* — Man Phan
*Assistant Examiner* — Ryan Kavleski
(74) *Attorney, Agent, or Firm* — Wenderoth Lind & Ponack, L.L.P.

(57) ABSTRACT

A moving picture coding method, a moving picture decoding method, a moving picture coding device, and a moving picture decoding device perform skipped display even in a moving picture decoding device having insufficient processing capability and while suppressing an increase in an amount of coded data. A plurality of combined pictures are generated each of which is generated by combining a plurality of pictures into a combined picture having the plurality of pictures as regions. The plurality of the combined pictures is coded and a slice boundary between the regions is set in the combined picture. For each of the plurality of combined pictures, when the combined picture has one or more to-be-displayed region except at least one not-to-be-displayed region, the to-be-displayed region is coded with reference to only a to-be-displayed region of another combined picture. The one or more to-be-displayed region is displayed for skipped reproduction.

13 Claims, 24 Drawing Sheets

Reference Range of Picture

Coded Data

| Macroblock Type | Reference Index for Reference Picture | Motion Vector | ... |

Reference Range of Picture

Coded Data

FIG. 22

| Mode | 0 | 1 | 2 | 3 | 4 |
|---|---|---|---|---|---|
| Constant Speed | ○ | × | × | × | × |
| 1/2 Slow Speed | ○ | × | ○ | × | ○ |
| Slow Speed | ○ | ○ | ○ | ○ | ○ |
| 1/N Slow Speed | | | | | |

MOVING PICTURE CODING METHOD, MOVING PICTURE DECODING METHOD, MOVING PICTURE CODING DEVICE, AND MOVING PICTURE DECODING DEVICE

BACKGROUND OF THE INVENTION (1) Field of the Invention

The present invention relates to methods and devices for coding moving pictures and methods and devices for decoding the moving pictures, and more particularly to a method and a device for coding moving pictures (hereinafter, referred to as a "moving picture coding method" and a "moving picture coding device") and a method and a device for decoding the moving pictures (hereinafter, referred to as a "moving picture decoding method" and a "moving picture decoding device") which can reproduce the moving pictures by both of skipped display and consecutive display.

(2) Description of the Related Art

In the field of compression coding technologies for moving pictures, a Moving Picture Experts Group (MPEG) is known. In recent years, MPEG-2, MPEG-4, MPEG-4AVC, and the like have been widely used as main standards defined by the MPEG. The compression technologies of such MPEG standards are mainly characterized in that a difference between a picture to be coded (hereinafter, referred to as a "to-be-coded picture") and a picture which has been coded and reconstructed (hereinafter, referred to as a "reference picture") is applied with Discrete Cosine Transform (DCT) and quantization, and then variable length coding (hereinafter, regarding the MPEG compression technologies, refer to "H.264/AVC Kyokasho (H.264/AVC Textbook)", Sakae Okubo et al., Kabushikikaisha Impress, 2004).

FIG. 1 is a diagram for explaining a coding method performed by a conventional MPEG coding device.

FIG. 1 shows an example of the case where two pictures are coded within a time period T. In FIG. 1, a horizontal axis represents a time, and numerals 1 to 4 are picture numbers assigned to pictures. Pictures assigned with the picture number 1 to 4 (hereinafter, referred to as "pictures 1 to 4") are coded in an order of the picture numbers.

In addition, in FIG. 1, the pictures 1 to 4 have reference relationships shown by arrows of FIG. 1 as relationships between to-be-coded pictures and reference pictures. Here, it is shown that there are respective reference relationships between the pictures 1 and 2, between the pictures 2 and 3, and between the pictures 3 and 4.

In FIG. 1, a to-be-coded picture is coded with reference to a reference picture which is designated by such a reference relationship.

FIGS. 2 and 3 are diagrams for explaining a decoding method performed by a conventional MPEG decoding device.

FIG. 2 shows an example of the case where consecutive display is performed on coded data by the MPEG decoding device on the condition shown in FIG. 1 (condition that two pictures are coded within the time period T).

FIG. 3 shows an example of the case where skipped display is performed on coded data by the MPEG decoding device on the condition shown in FIG. 1 (condition that two pictures are coded within the time period T).

In FIGS. 2 and 3, in the same manner as FIG. 1, a horizontal axis represents a time, and numerals 1, 2, and 3 are picture numbers assigned to pictures. Here, it is shown that the pictures of FIGS. 2 and 3 assigned with the same picture numbers as FIG. 1 are pictures which have been coded in FIG. 1 and are to be decoded (namely, reproduced) in FIGS. 2 and 3.

Here, the MPEG decoding device of FIGS. 2 and 3 is a decoding device which decodes only one picture at maximum within the time period T.

As shown in FIG. 2, in the case of the consecutive display, the pictures are decoded and displayed sequentially in the order of the picture numbers starting from the picture 1. For example, when the time period T is set to one second in the MPEG decoding device, the consecutive display results in reproducing moving pictures at a low speed (hereinafter, referred to also as "low-speed reproduction").

On the other hand, as shown in FIG. 3, in the case of the skipped display, the picture 1 is displayed during the first time period T and then the picture 3 is displayed during the following time period T. In other words, the pictures 1 and 3 are displayed, by skipping display of the picture 2. For example, when the time period T is set to one second in the MPEG decoding device, the skipped display results in reproducing moving pictures at a constant speed (hereinafter, referred to also as "constant-speed reproduction").

However, in order to achieve the skipped display of FIG. 3 by skipping display of the picture 2, decoding of the picture 2 should not be skipped for the skipped display. This is because, as obvious from the reference relationship shown in FIG. 1, the picture 3 has a reference relationship with the picture 2. Therefore, even the picture 2 needs to be decoded to display the picture 3. In short, there is a problem that even a picture which does not need to be displayed is to be decoded when the picture has a reference relationship with other picture to be displayed.

Therefore, the skipped display is difficult for such a device which decodes only one picture in coded data per the time period T, when a plurality of pictures coded during the time period T in the coded data have reference relationships among them.

In order to address the above problem, a method have been proposed for achieving skipped display without decoding pictures which do not need to be displayed (refer to Japanese Unexamined Patent Application Publication No. 2003-299103 (hereinafter, referred to as "Patent Reference 1"), for example.) FIG. 4 is a diagram for explaining a coding method by which the decoding device disclosed in Patent Reference 1 can eventually achieve the skipped display without decoding pictures which do not need to be reproduced.

In FIG. 4, there are reference relationships among pictures, as shown by arrows. Here, it is shown that there are localized reference relationships between the pictures 1 and 2, between the pictures 1 and 3, and between the pictures 3 and 4.

Patent Reference 1 achieves the skipped display by coding the pictures according to the reference relationships shown by the arrow of FIG. 4, and then decoding only the pictures 1 and 3 while skipping decoding of the picture 2.

In the meanwhile, one example of such devices requiring both of the skipped display and the consecutive display is video cameras capable of recording image at a high speed (hereinafter, referred to as "high-speed recording"). Using, as one example, constant-speed reproduction and slow-speed reproduction of image recorded by the high-speed recording of the video cameras, the above description is explained below in more detail.

FIG. 5 is a diagram showing one example where the video camera capable of the high-speed recording records images.

In FIG. 5, it is shown, as one example, that firstly two images (pictures) are recorded within one second in a normal recording mode and then six images (pictures) are recorded within following one second in a high-speed recording mode. This means that two pictures are coded in one second in the normal recording mode, and six pictures are coded in one second in the high-speed recording mode. It should be noted that numerals in FIG. 5 represent picture numbers assigned to the pictures and also represent an order of recording the pictures by the video camera, namely, an order of coding the pictures.

FIGS. 6 and 7 are diagrams showing examples of reproducing the images (pictures) recorded by the video camera in FIG. 5. Here, a MPEG decoding device regarding FIGS. 6 and 7 is a decoding device which decodes only two pictures at maximum within one second.

FIG. 6 shows an example of the slow-speed reproduction achieved by consecutive display in the case of a reproduction mode performing consecutive display. As shown in FIG. 6, in the case of the consecutive display, the images recorded by the video camera during a period of the high-speed recording are decoded and reproduced consecutively in an order starting from the picture 2. As a result, the display (view) becomes slow-speed reproduction. On the other hand, FIG. 7 shows an example of the constant-speed reproduction achieved by skipped display in the case of the reproduction mode performing skipped display. Since the MPEG decoding device of FIG. 7 is a decoding device which decodes only two pictures per second, the constant-speed reproduction is achieved by decoding two pictures 2 and 5 in one second, as shown in FIG. 7. Here, the constant-speed reproduction is one example of the reproduction mode performing the skipped display.

Next, methods for coding and decoding pictures recorded by the video camera are described.

FIG. 8 is a diagram for explaining a conventional coding method performed by the video camera. FIG. 8 corresponds to the above-described case of FIG. 1. FIG. 9 is a diagram for explaining a conventional decoding method performed by the video camera. FIG. 9 corresponds to the above-described skipped display of FIG. 7.

In FIG. 8, two pictures are coded per second in the normal recording mode, and six pictures are coded per second in the high-speed recording mode. Here, there are reference relationships among the pictures, as shown by arrows of FIG. 8. In more detail, in FIG. 8, each of to-be-coded pictures is coded with reference to a reference picture which is designated by a reference relationship, such as a reference relationship between the pictures 0 and 1, between the pictures 1 and 2, between the pictures 2 and 3, between the pictures 3 and 4, or between the pictures 4 and 5.

However, in order to achieve the skipped display of FIG. 9 by skipping display of the pictures 3 and 4 or the pictures 6 and 7, decoding of the pictures 3 and 4 or the pictures 6 and 7 which do not need to be displayed should not be skipped for the skipped display. This is because, for the same reason as FIG. 2, as obvious from the reference relationship shown in FIG. 8, pictures which do not need to be displayed are to be decoded when the pictures have reference relationships with other pictures to be displayed.

FIG. 10 is a diagram for explaining the coding method performed by the video camera of Patent Reference 1. FIG. 10 corresponds to the above-described case of FIG. 4. FIG. 11 is a diagram for explaining the decoding method of the video camera of Patent Reference 1. FIG. 11 corresponds to the above-described skipped display of FIG. 7.

In FIG. 10, two pictures are coded per second in a normal recording mode, and six pictures are coded per second in a high-speed recording mode. Here, there are localized reference relationships among the pictures shown by arrows of FIG. 10. In more detail, in FIG. 10, each of to-be-coded pictures are coded with reference to a reference picture which is designated by a localized reference relationship, such as a localized reference relationship between the pictures 0 and 1, between the pictures 1 and 2, between the pictures 2 and 5, between the pictures 3 and 6, or between the pictures 4 and 8.

Thereby, in FIG. 11, it is possible to skip decoding of the pictures 3 and 4 or the pictures 6 and 7 which do not need in the skipped display, thereby achieving the constant-speed reproduction in which only the pictures 2 and 5 are displayed as the skipped display. This makes it possible to achieve the skipped display for constant-speed reproduction even in the decoding device having insufficient processing capability which decodes only a specific number of pictures per a predetermined time period, for example, two pictures per second.

SUMMARY OF THE INVENTION

However, the method disclosed in Patent Reference 1 for performing coding according to the localized reference relationships has a problem of increase of an amount of coded data.

The following describes the cause of the problem, using processing by a MPEG-4AVC standard as one example.

In the MPEG-4AVC, it is possible to designate a reference picture for each macroblock included in a to-be-coded picture.

FIG. 12 is a diagram showing an example of the case where a "maximum reference index for reference picture" which represents a reference range of a to-be-coded picture is equal to or more than 2. FIG. 13 is a diagram showing coded data of the to-be-coded picture of FIG. 12. Hereinafter, a reference index for reference picture is a numeral for specifying a reference picture which is referred to for inter-picture prediction per macroblock or per block. For example, regarding the reference indexes for reference pictures used for decoding a P picture, a smaller reference index for reference picture is generally assigned to a reference picture used in decoding later, and a larger reference index for reference picture is generally assigned to a reference picture used in decoding earlier. The maximum reference index for reference picture is an index representing the largest index assigned as the reference index for reference picture. The larger the maximum reference index for reference picture is, the longer a reference distance from a to-be-coded picture to a reference picture.

The coded data in the case where the maximum reference index for reference picture is equal to or more than 2 as shown in FIG. 12 includes data which is generated by performing variable length coding on a macroblock type, a reference index for reference picture, a motion vector, and the like.

On the other hand, FIG. 14 is a diagram showing an example of the case where a maximum reference index for reference picture which is a reference range of a to-be-coded picture is equal to 1. FIG. 15 is a diagram showing coded data of the to-be-coded picture of FIG. 14.

The coded data in the case where the maximum reference index for reference picture is equal to 1 as shown in FIG. 14 includes data which is generated by performing variable length coding on a macroblock type, a motion vector, and the like.

As obvious from comparison of the coded data of FIG. 13 with the coded data of FIG. 14, an amount of coded data in the case where a maximum reference index for reference picture is 1 becomes smaller than the case where a maximum reference index for reference picture is equal to or more than 2.

Therefore, when there are localized reference relationships among pictures as shown in FIGS. 4 and 10, a maximum reference index for reference picture of a to-be-coded picture becomes equal to or more than 2, so that the amount of coded data becomes larger than the case where the maximum reference index for reference picture is 1.

In order to address the above problems, an object of the present invention is to provide a moving picture coding method, a moving picture coding device, a moving picture decoding method, and a moving picture decoding device, by which skipped display can be performed even in the moving picture decoding device having insufficient processing capability and the increase of an amount of coded data can be suppressed.

In accordance with a first aspect of the present invention for solving the above problems, there is provided a moving picture coding method of coding a moving picture stream, the method including: generating a plurality of combined pictures each of which is generated by combining a plurality of pictures into a combined picture having the plurality of pictures as regions, the plurality of pictures being a part of a plurality of pictures included in the moving picture stream; coding the plurality of the combined pictures; and setting a slice boundary between the regions in the combined picture, wherein, in the coding, for each of the plurality of combined pictures, when the combined picture has one or more to-be-displayed region except at least one not-to-be-displayed region, the to-be-displayed region is coded with reference to only a to-be-displayed region of another combined picture, the one ore more to-be-displayed region being to be displayed for skipped reproduction. It is preferable that, in the coding, the to-be-displayed region is coded with reference to a to-be-displayed region included in another combined picture which is the nearest to the combined picture in a coding order.

The moving picture coding method according to the present invention combines N pictures which are a plurality of to-be-coded pictures in a stream and will become slice regions in a resulting combined picture, into a combined picture of a 1×N size, and then performs motion compensation on the combined picture so that a localized reference relationship can be established only between slice regions of different combined pictures having a reference relationship necessary for skipped display. By combining a plurality of to-be-coded pictures into one combined picture, for example, by setting a maximum reference index for reference picture to be 1, the moving picture coding method according to the present invention can remove information of a maximum reference index for reference picture from coded data of a combined picture. In addition, in the moving picture coding method according to the present invention, slice boundaries are set in the combined picture to segment the combined picture into regions each having a 1 picture size, and the combined picture is added with header information indicating information of a picture size (1×N size) and a maximum reference index for reference picture regarding the combined picture, then the combined picture is coded with the header information, and eventually the resulting coded data is outputted.

Thereby, it is possible to realize a moving picture coding method by which skipped display can be performed even by a moving picture decoding device having insufficient processing capability, thereby suppressing increase of an amount of the coded data.

In accordance with another aspect of the present invention for solving the above problems, there is provided a moving picture decoding method of decoding a coded moving picture stream, the method including: specifying a picture size of a to-be-decoded picture included in the coded moving picture stream, and determining based on the specified picture size whether or not the to-be-decoded picture is a combined picture which is generated by combining a plurality of pictures as slices of the combined picture; and decoding at least one of the slices included in the to-be-decoded picture and reconstructing the decoded slice as a picture, when the determining is made that the to-be-decoded picture is the combined picture.

The moving picture decoding device according to the present invention decodes the coded data of the combined picture of a 1×N size which has been coded by the above moving picture coding device. When the skipped display is to be performed, when a single target slice (slice region) in the combined picture (to-be-decoded picture) has a reference relationship necessary for skipped reproduction, the single target slice having information of a maximum reference index for reference picture is decoded and displayed, thereby achieving the skipped display. When the single target slice does not have any reference relationship necessary for the skipped reproduction, decoding of the single target slice is skipped (in other words, the single target slice is not decoded). Here, there is no dependence relationship among the slice regions in the to-be-decoded picture, and the skipping is processing for searching for a bit pattern indicating a start slice of each slice. Therefore, this processing according to the present invention has processing loads much smaller than normal decoding method. By repeating the above processing N times, a whole of the to-be-decoded picture having a 1×N size has been reproduced.

Thereby, it is possible to realize a moving picture decoding method by which skipped display can be performed even by a moving picture decoding device having insufficient processing capability, thereby suppressing increase of an amount of coded data.

Furthermore, in order to solve the above problems, the present invention can be realized as a video camera system including: an input interface to which video and audio are inputted; a signal processing unit which coding and decoding the video (moving pictures) and coding and decoding the audio; an output interface from which the video and the audio are outputted; a recording interface which records the video and audio as data; and a camera signal processing unit which controls the signal processing unit, the input interface, the output interface, and the recording interface. Here, the signal processing unit includes: a moving picture coding unit which codes the moving pictures; and a moving picture decoding unit which decodes the coded moving pictures. The moving picture coding unit includes a moving picture coding device which codes a moving picture stream, the device including:

a combination unit operable to generate a plurality of combined pictures each of which is generated by combining a plurality of pictures into a combined picture having the plurality of pictures as regions, the plurality of pictures being a part of a plurality of pictures included in the moving picture stream; a coding unit operable to code the plurality of the combined pictures; and a slice boundary setting unit operable to set a slice boundary between the regions in the combined picture, wherein, for each of the plurality of combined pictures, when the combined picture has one or more to-be-displayed region except at least one not-to-be-displayed region, the coding unit is operable to code the to-be-displayed region with reference to only a to-be-displayed region of another combined picture, the one or more to-be-displayed region being to be displayed for skipped reproduction. The moving picture decoding unit includes a moving picture decoding device which decodes a coded moving picture stream, the device including: a determination unit operable to specify a picture size of a to-be-decoded picture included in the coded moving picture stream, and determine based on the specified picture size whether or not the to-be-decoded picture is a combined picture which is generated by combining a plurality of pictures as slices of the combined picture; and a decoding unit operable to decode at least one of the slices included in the to-be-decoded picture and reconstruct the decoded slice as a picture, when the determining unit determines that the to-be-decoded picture is the combined picture.

Furthermore, in order to solve the above problems, the present invention can be realized as a digital television system including: a modem unit which modulates and demodulates signals obtained from a tuner; a decoding unit which performs descrambling and decoding of transport stream; a signal processing unit which performs video (moving pictures) decoding and audio decoding; an output unit which outputs the video and the audio. Here, the signal processing unit includes a moving picture decoding unit which decodes the moving pictures. The moving picture decoding unit includes a moving picture decoding device which decodes a coded moving picture stream, the device including: a determination unit operable to specify a picture size of a to-be-decoded picture included in the coded moving picture stream, and determine based on the specified picture size whether or not the to-be-decoded picture is a combined picture which is generated by combining a plurality of pictures as slices of the combined picture; and a decoding unit operable to decode at least one of the slices included in the to-be-decoded picture and reconstruct the decoded slice as a picture, when the determining unit determines that the to-be-decoded picture is the combined picture.

It should be noted that the present invention can be realized not only as the above methods, devices, and systems, but also as: an integrated circuit which includes the processing units of the devices; a system which includes the devices; a method which includes steps performed by the processing units of the devices; a program which causes a computer to execute the steps; information describing the program; and the like. Off course, the program and the information may be distributed via a recording medium such as a CD-ROM or a communication medium such as the Internet.

According to the present invention, it is possible to provide a moving picture coding method, a moving picture decoding method, a moving picture coding device, and a moving picture decoding device, by which skipped display can be performed even in a moving picture decoding device having insufficient processing capability and increase of an amount of coded data can be suppressed.

FURTHER INFORMATION ABOUT TECHNICAL BACKGROUND TO THIS APPLICATION

The disclosure of Japanese Patent Application No. 2007-056993 filed on Mar. 7, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 22 is a table showing reproduction modes according to the first embodiment of the present invention;

DESCRIPTION OF THE INVENTION

The following describes preferred embodiments of the present invention with reference to the drawings. The embodiments are mere examples of the present invention and the scope of the present invention is not limited to them.

(First Embodiment)

Figure 16:
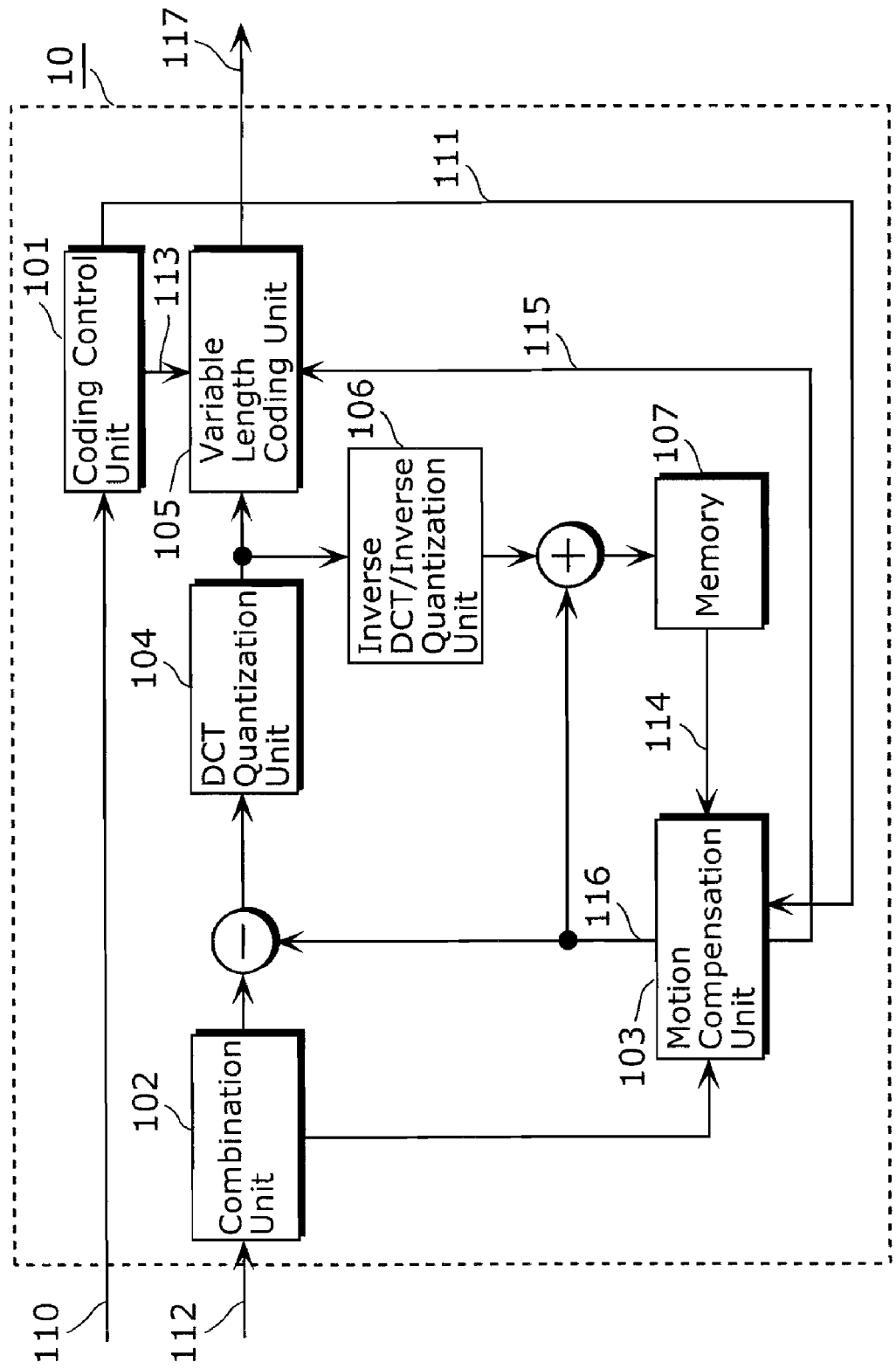
FIG. 16 is a diagram showing a structure of a moving picture coding device according to the first embodiment of the present invention.
Figure 17:
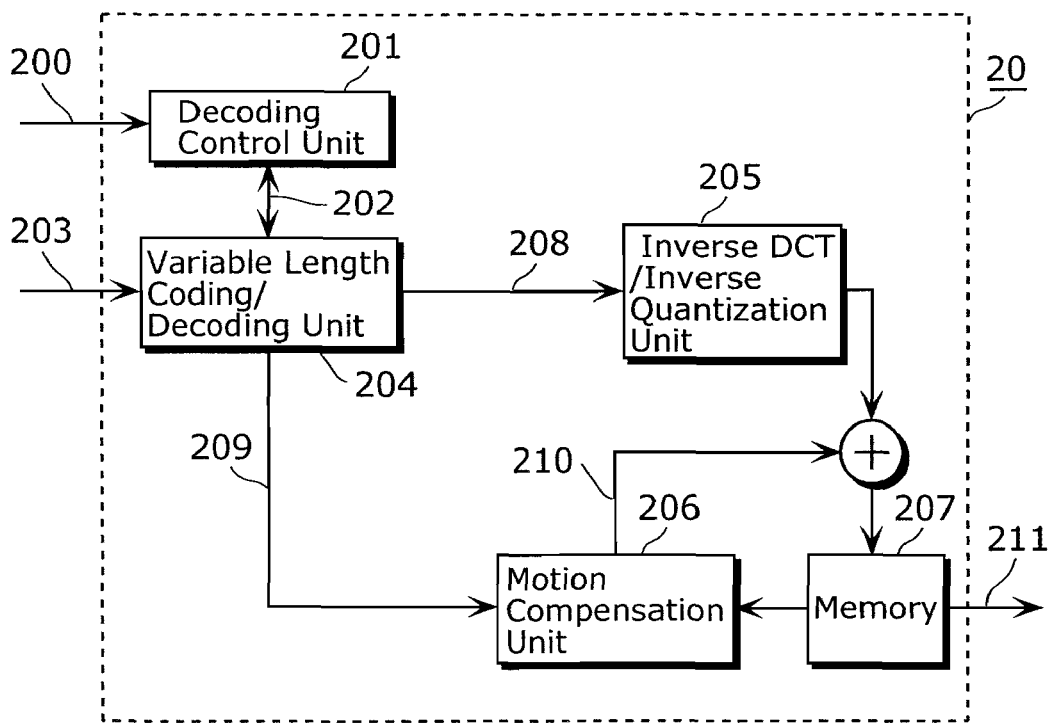
FIG. 17 is a diagram showing a structure of a moving picture decoding device according to the first embodiment of the present invention.

FIG. 16 is a diagram showing a structure of a moving picture coding device 10 according to the first embodiment of the present invention. FIG. 17 is a diagram showing a structure of a moving picture decoding device 20 according to the first embodiment of the present invention.

Figure 18:
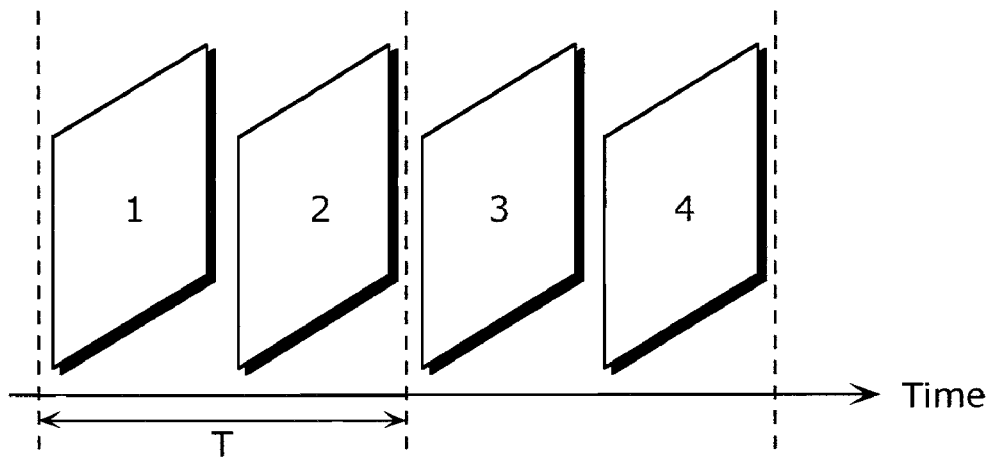
FIG. 18 is a diagram showing a temporal order of coding to-be-coded pictures according to the first embodiment of the present invention.

FIG. 18 is a diagram showing a temporal order of coding to-be-coded pictures according to the first embodiment of the present invention.

For the sake of simplicity of the description, the description is given under the following assumption. It is assumed that the moving picture coding device 10 according to the first embodiment of the present invention, which is a recording system, codes two to-be-coded pictures at maximum within a time period T as shown in FIG. 18. In other words, up to two pictures can be coded per the time period T. When generally one picture is coded per the time period T, the coding of two pictures per the time period T means recording at a double speed (hereinafter, referred to also as "high-speed recording").

Figure 1:
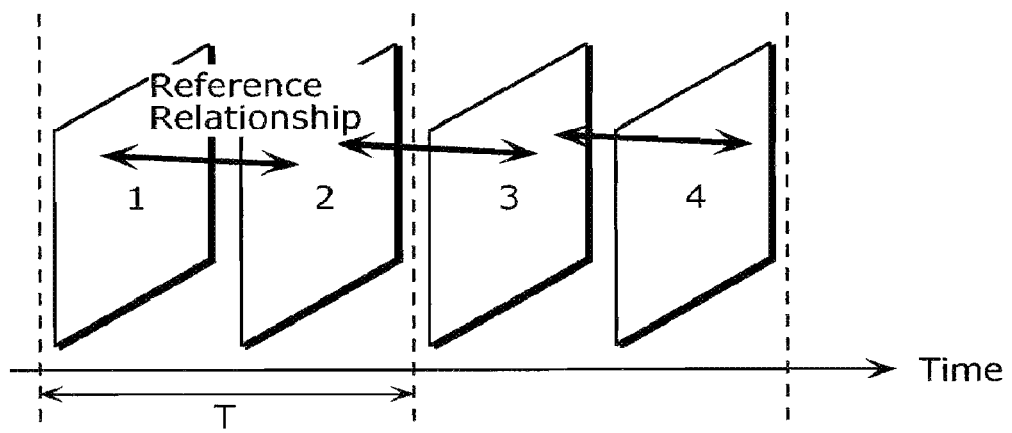
FIG. 1 is a diagram for explaining a coding method performed by a conventional MPEG coding device.
Figure 2:
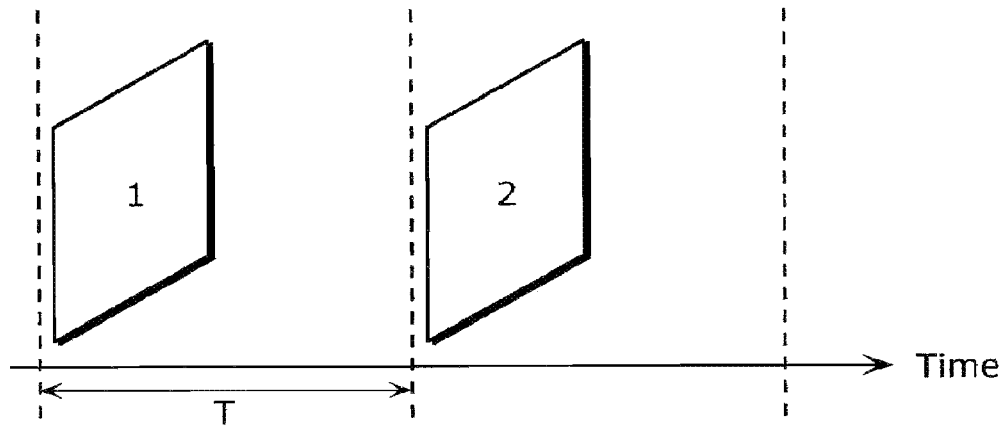
FIG. 2 is a diagram for explaining a decoding method performed by the conventional MPEG decoding device.
Figure 3:
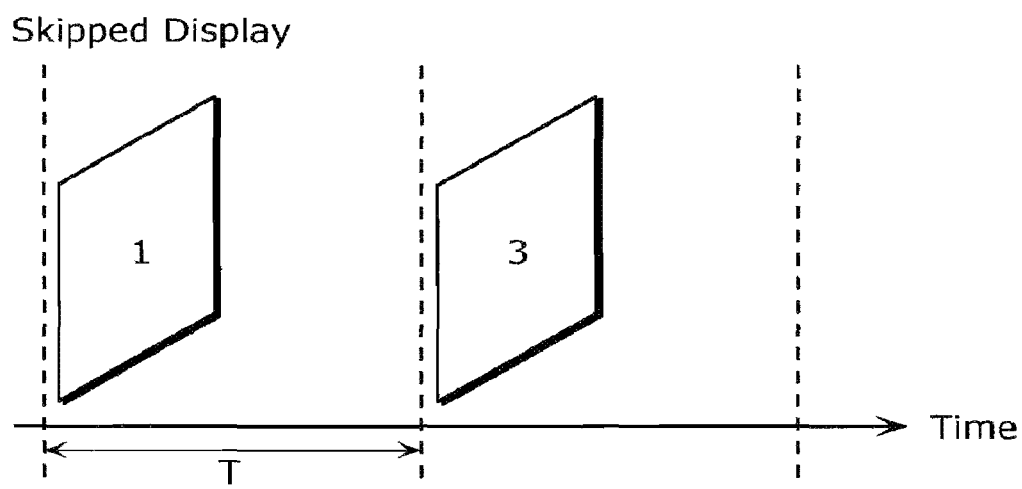
FIG. 3 is a diagram for explaining a decoding method performed by the conventional MPEG decoding device.
Figure 4:
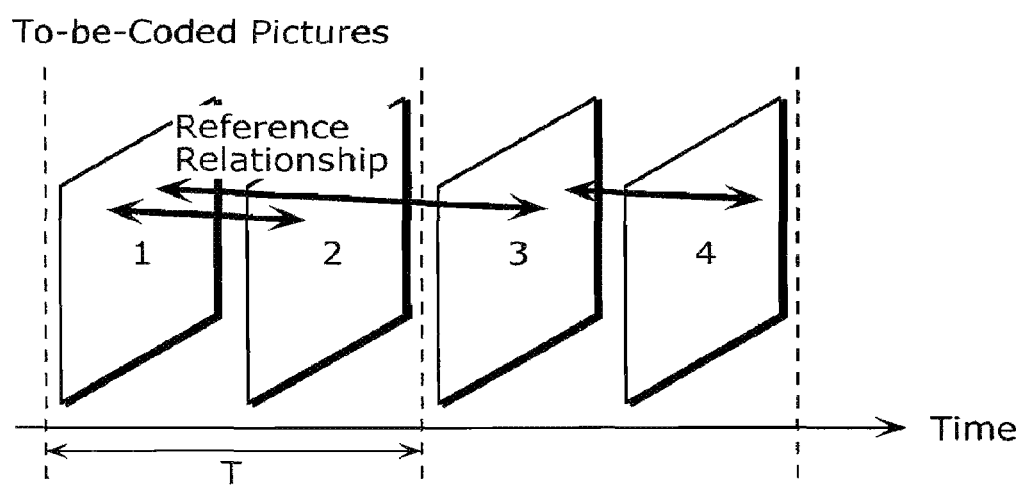
FIG. 4 is a diagram for explaining a coding method by which the conventional MPEG decoding device can afterwards achieve skipped display without decoding pictures which do not need to be displayed.

It is also assumed that the moving picture decoding device 20 according to the first embodiment of the present invention, which is a reproduction system, decodes one picture to be displayed (to-be-displayed picture) at maximum within the time period T. In other words, up to one picture can be decoded per the time period T. Under this assumption, when all pictures in coded data recorded at a double speed by the moving picture coding device 10 are directly decoded and consecutively displayed as shown in FIG. 2, images are reproduced at a slow speed. On the other hand, as shown in FIG. 3, when the skipped display is performed to display every other picture, the images are reproduced at a constant speed (normal speed).

Firstly, the description is given for the moving picture coding device 10 according to the first embodiment of the present invention, which is a recording system, with reference to FIG. 16.

The moving picture coding device 10 includes a coding control unit 101, a combination unit 102, a motion compensation unit 103, a DCT quantization unit 104, a variable length coding unit 105, an inverse DCT/inverse quantization unit 106, and a memory 107.

The coding control unit 101 receives a high-speed recording mode signal 110 according to instructions from a user, for example.

When the coding control unit 101 receives the high-speed recording mode signal 110 (in other words, in the case of a high-speed recording mode), the coding control unit 101 instructs the combination unit 102 to combine (i) two to-be-coded pictures obtained from a to-be-coded picture signal 112 which is a data signal of input to-be-coded pictures into (ii) a combined picture having a 1×2 size (in other words, a combined picture in which two to-be-coded pictures are stacked vertically).

Here, the coding control unit 101 instructs to treat the to-be-coded pictures included in the combined picture of a 1×2 size, as slices in the combined picture. In addition, the coding control unit 101 designates, as a boundary between the slices (hereinafter, referred to as a "slice boundary"), a boundary between the to-be-coded pictures combined into the combined picture. The slice, namely the original to-be-coded picture, has a size of original 1 picture (hereinafter, referred to as "1 picture size). When the recording mode is the high-speed recording mode, the coding control unit 101 provides the motion compensation unit 103 with an instruction signal 111 for designating a combined to-be-coded picture and its reference picture to have localized reference relationships between each to-be-coded picture in the combined picture and each picture in the reference picture.

When the recording mode is not the high-speed recording mode, the coding control unit 101 instructs the combination unit 102 to store every picture included in the to-be-coded picture signal 112 as one to-be-coded picture, without combining the picture with any other picture.

In addition, every time all of the slices included in one combined to-be-coded picture have been coded, in other words, every time one combined to-be-coded picture has been coded, the coding control unit 101 determines whether or not a picture size of the to-be-coded picture is changed from a picture size of an immediately-prior to-be-coded picture which has been coded immediately prior to the to-be-coded picture. The coding control unit 101 provides the variable length coding unit 105 with an instruction signal 113 indicating a result of the determination of the picture size change.

The combination unit 102 stores the to-be-coded picture signal 112 according to the instructions from the coding control unit 101.

When the recording mode is the high-speed recording mode, according to the instructions from the coding control unit 101, the combination unit 102 combines two pictures in the to-be-coded picture signal 112 into a combined picture of a 1×2 size, and stores the resulting combined picture. On the other hand, when the recording mode is not the high-speed recording mode, according to the instructions from the coding control unit 101, the combination unit 102 stores every picture included in the to-be-coded picture signal 112 as one to-be-coded picture without combining the picture with any other picture.

Here, the combination unit 102 may store such a to-be-coded picture which includes one picture obtained from the to-be-coded picture signal 112, in the case where there is no instruction from the coding control unit 101.

The motion compensation unit 103 detects a motion vector from (i) a reference picture signal 114 which is a data signal regarding the reference picture stored in the memory 107 and (ii) the input to-be-coded picture signal 112, and performs motion compensation on a target to-be-coded picture based on the detected motion vector. The motion compensation unit 103 performs the motion compensation to generate a prediction reference picture for the target to-be-coded picture. The motion compensation unit 103 outputs (i) a motion vector signal 115 which is a signal regarding the detected motion vector and (ii) a prediction reference picture signal 116 which is a data signal regarding the generated prediction reference picture.

Here, the reference picture signal 114 is generated by adding a result of the inverse DCT/inverse quantization unit 106 with the prediction reference picture signal 116 (hereinafter, the processing is referred to as "motion-compensation-inter-picture-predication-coding").

In addition, according to the instruction signal 111 from the coding control unit 101, the motion compensation unit 103 performs motion-compensation-inter-picture-predication-coding on the combined to-be-coded picture, with reference to regions in a reference picture which are designated by localized reference relationships with the regions in the combined to-be-coded picture.

Here, according to the instruction signal 111 from the coding control unit 101, the motion compensation unit 103 performs motion-compensation-inter-picture-predication-coding on the combined picture of a 1×2 size which is stored in the combination unit 102 in the high-speed recording mode, with reference to regions in a reference picture which are designated by localized reference relationships.

It should be noted that, in the case where intra-picture prediction coding is performed, the above processing of the motion compensation unit 103 is skipped.

The DCT quantization unit 104 performs DCT and quantization on a difference (prediction error picture signal) between (i) a prediction reference picture signal 116 which is provided from the motion compensation unit 103 and (ii) the to-be-coded picture signal 112.

The variable length coding unit 105 performs variable length coding on the prediction error picture signal which has been outputted from the DCT quantization unit 104 and on which DCT and quantization have been performed, and thereby outputs a coded data signal 117.

The variable length coding unit 105 segments the combined to-be-coded picture, which has been generated by the combination performed by the combination unit 102 and applied with the DCT and quantization by the DCT quantization unit 104, into slices by slice boundaries 700 in a raster order. Then, the variable length coding unit 105 performs coding per slice having an original 1 picture size.

When a picture size of a target to-be-coded picture in the prediction error picture signal for which variable length coding is to be performed is changed from a previous picture size, the variable length coding unit 105 codes header information indicating the picture size and indicating that a maximum reference index for reference picture is 1, according to the instruction signal 113 from is the coding control unit 101.

In addition, the variable length coding unit 105 performs variable length coding also on side information such as a motion vector signal 115 obtained from the motion compensation unit 103.

The inverse DCT/inverse quantization unit 106 performs inverse DCT and inverse quantization on the prediction error picture signal which has been outputted from the DCT quantization unit 104 and applied with DCT and quantization, and thereby outputs the resulting prediction error picture signal.

The memory 107 stores a reference picture which is generated by adding the prediction error picture signal outputted from the inverse DCT/inverse quantization unit 106 with the prediction reference picture signal 116 outputted from the motion compensation unit 103.

As described above, a plurality of combined pictures are generated by combining a plurality of pictures into each combined picture having the plurality of pictures as regions. Here, the plurality of pictures are a part of a plurality of pictures included in the moving picture stream. Also, a slice boundary is set between the regions in the combined picture. Then, for each of the plurality of combined pictures, when the combined picture has one or more to-be-displayed region except at least one not-to-be-displayed region, the to-be-displayed region is coded with reference to only a to-be-displayed region of another combined picture. Here, the one ore more to-be-displayed region is to be displayed for skipped reproduction.

Thereby, it is possible to realize the moving picture coding device 10 and its method for coding a moving picture stream so that a combined to-be-coded picture has a maximum reference index of 1 while having localized reference relationships with a reference picture.

Next, the combined to-be-coded picture which has been combined by the moving picture coding device 10 is described in more detail.

Figure 19:
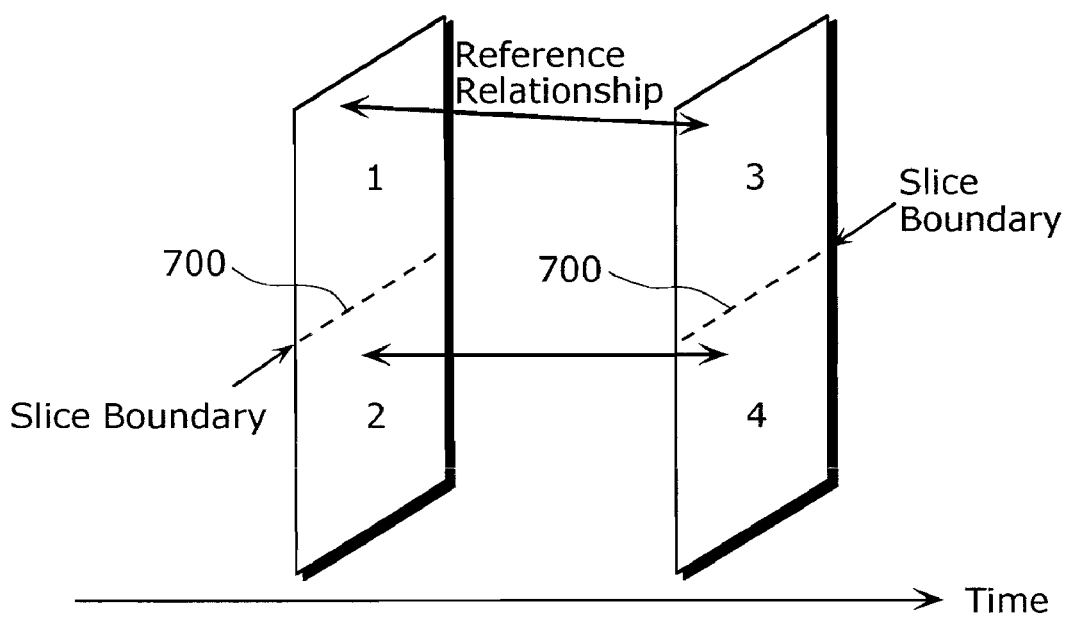
FIG. 19 is a diagram for explaining localized reference relationships in a combined to-be-coded picture having a 1×2 size.

FIG. 19 is a diagram for explaining localized reference relationships between combined to-be-coded pictures each having a 1×2 size.

In FIG. 19, it is shown that the combination unit 102 combines the to-be-coded picture 1 and the to-be-coded picture 2 into a combined picture having a 1×2 size, and combines the to-be-coded picture 3 and the to-be-coded picture 4 into another combined picture having a 1×2 size.

As shown in FIG. 19, there are designated reference relationships between the to-be-coded picture 1 and the to-be-coded picture 3, and between the to-be-coded picture 2 and the to-be-coded picture 4. The motion compensation unit 103 performs motion-compensation-inter-picture-predication-coding on the combined picture with reference to reference regions (slices or original to-be-coded pictures in a reference picture) according to such designated reference relationships.

Furthermore, the combined to-be-coded picture is segmented into slices each having a 1 picture size by slice boundaries 700 in a raster order, and then coded. Here, as one example, the combined to-be-coded picture is segmented into two slices of a slice 1 (the original to-be-coded picture 1) and a slice 2 (the original to-be-coded picture 2), and the two slices are coded, respectively.

Next, the description is given for the moving picture decoding device 20 according to the first embodiment of the present invention which is a reproduction system with reference to FIG. 17. For the sake of simplicity of the description, it is assumed that data to be decoded has been applied with motion-compensation-inter-picture-predication-coding.

The moving picture decoding device 20 includes a decoding control unit 201, a variable length decoding unit 204, an inverse DCT/inverse quantization unit 205, a motion compensation unit 206, and a memory 207.

The decoding control unit 201 determines a picture size of a picture to be decoded (hereinafter, referred to as a "to-be-decoded picture"), based on header information decoded by the variable length decoding unit 204. For example, the decoding control unit 201 determines whether or not a picture size of the to-be-decoded picture is a combined picture size, such as a 1×2 size of combining two pictures.

If it is determined that the picture size is not a combined picture size, in other words, if the to-be-decoded picture has a size of one picture (a 1 picture size) for example, the decoding control unit 201 instructs, using a signal 202, the variable length decoding unit 204, the inverse DCT/inverse quantization unit 205, the motion compensation unit 206, and the memory 207 to decode the to-be-decoded picture as one picture and display the decoded picture as one picture.

On the other hand, if it is determined that the picture size of the to-be-decoded picture is the combined picture size, in other words, if the to-be-decoded picture has a 1×2 picture size (a 1×2 size) for example, the decoding control unit 201 checks information of a reproduction mode instruction signal 200 for instructing a reproduction mode.

When the decoding control unit 201 receives a reproduction mode instruction signal 200 for instructing a constant-speed mode as the reproduction mode, for example, according to the reproduction mode instruction signal 200, the decoding control unit 201 performs instructing using the signal 202 to decode one slice in the to-be-decoded picture and display the decoded slice as one picture. Then, the decoding control unit 201 performs instructing using the signal 202 to skip a next slice in the to-be-decoded picture.

The variable length decoding unit 204 decodes the header information indicating a picture size, a maximum reference index for reference picture, and the like, by decoding a coded data signal 203, for example.

In addition, the variable length decoding unit 204 decodes the coded data signal 203 to decode the motion vector information, and then provides the motion compensation unit 206 with a motion vector information signal 209 which is a signal regarding the motion vector.

The variable length decoding unit 204 performs variable length decoding on the input coded data signal 203 according to the instructions from the decoding control unit 201. From the decoding control unit 201, the variable length decoding unit 204 receives designation of the reproduction mode, such a constant-speed mode, a 1/2 slow-speed mode, a slow-speed mode, or a 1/N speed mode. According to the designated reproduction mode, the variable length decoding unit 204 performs variable length decoding on the input coded data signal 203 per slice or per picture. According to the instructions from the decoding control unit 201, the variable length decoding unit 204 provides the inverse DCT/inverse quantization unit 205 with a decoded data signal 208 which is a signal of the decoded data.

The inverse DCT/inverse quantization unit 205 performs inverse DCT and inverse quantization on the decoded data signal 208 which has been inputted from the variable length decoding unit 204, and then outputs the resulting data.

The motion compensation unit 206 performs motion compensation using the motion vector information signal 209 which is provided from the variable length decoding unit 204 and a reference picture signal which is a data signal regarding a reference picture and obtained from the memory 207, according to the instructions from the decoding control unit 201. The motion compensation unit 206 outputs a prediction reference picture signal 210 which has been generated by the motion compensation.

The memory 207 stores a reference picture signal which has been generated by adding the prediction reference picture signal 210 provided from the motion compensation unit 206 with the decoded data signal 208 generated by the inverse DCT and the inverse quantization performed by the inverse DCT/inverse quantization unit 205.

The decoding control unit 201 instructs, using the signal 202, the variable length decoding unit 204, the inverse DCT/inverse quantization unit 205, the motion compensation unit 206, and the memory 207 to perform the above-described decoding method.

As described above, the moving picture decoding device 20 according to the first embodiment of the present invention decodes coded data for which motion-compensation-inter-picture-predication-coding has been performed. Here, when coded data for which intra-picture prediction coding has been performed is decoded, the processing of the motion compensation unit 206 is skipped.

Here, the case where the constant-speed mode is instructed as the reproduction mode is described assuming that the combined picture coded in FIG. 19 is to be decoded and displayed. When the constant-speed mode is designated as the reproduction mode for example, the slice 1 and the slice 3 which have a localized reference relationship with each other are sequentially decoded, and each of the decoded slices is displayed as one picture.

In the meanwhile, one example of devices requiring both of the skipped display and the consecutive display is a video camera capable of high-speed image recording. The above description is explained in more detail using, as examples, the high-speed recording, the constant-speed reproduction, and the slow-speed reproduction of the video camera.

Figure 20:
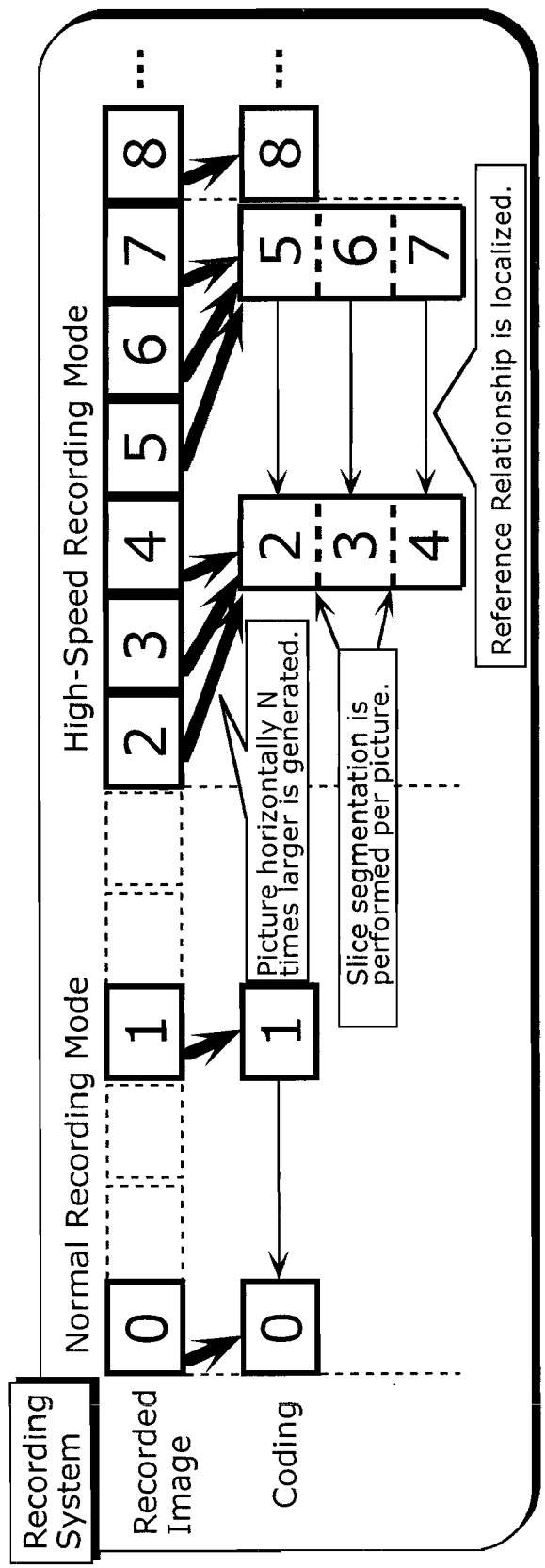
FIG. 20 is a diagram for explaining the case where one example of recording by the video camera is coded by the coding method according to the first embodiment of the present invention.

FIG. 20 is a diagram for explaining the case where one example of recording by the video camera capable of high-speed recording is coded by the moving picture coding method according to the first embodiment of the present invention.

Figure 5:
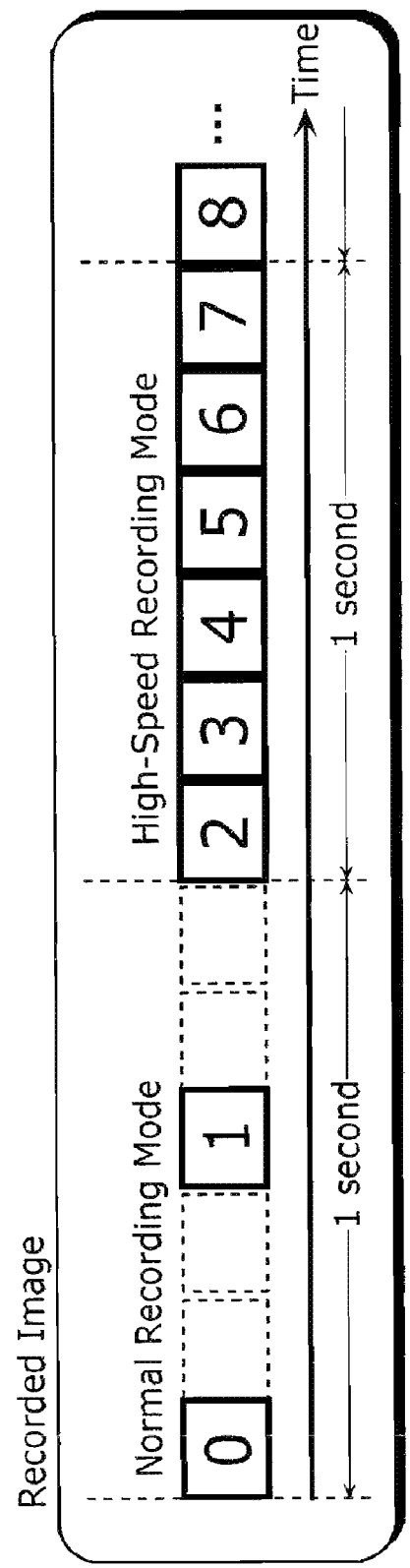
FIG. 5 is a diagram showing one example where a video camera capable of high-speed recording records images.
Figure 6:
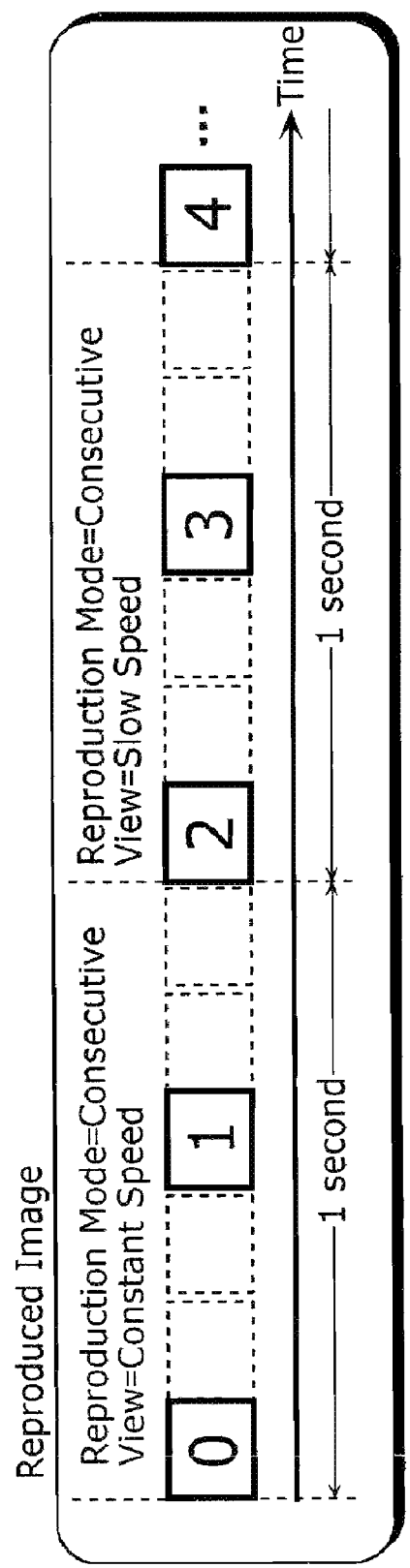
FIG. 6 is a diagram showing an example of reproducing the images recorded by the video camera.
Figure 7:
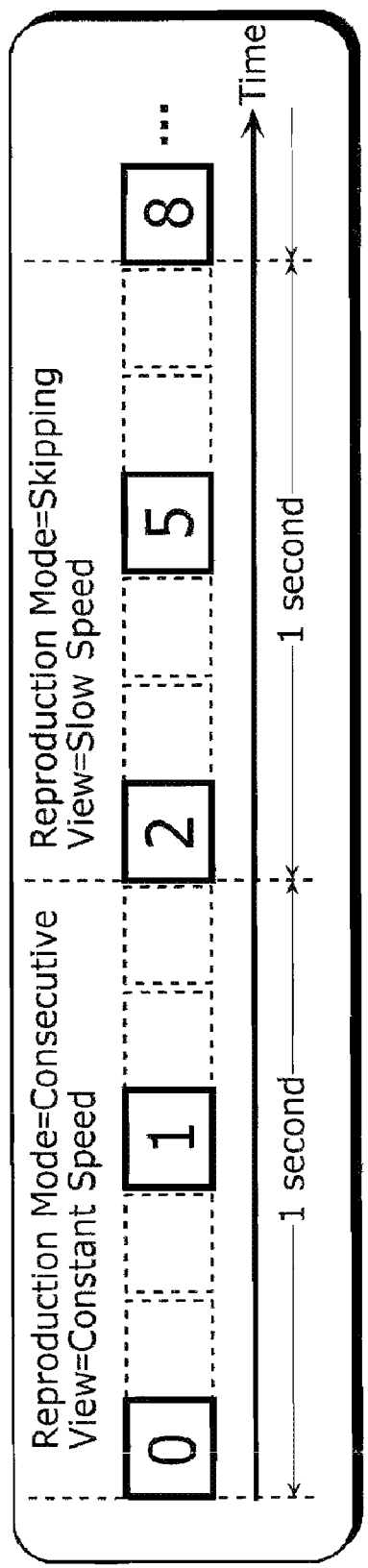
FIG. 7 is a diagram showing another example of the reproducing the imaged recorded by the video camera.
Figure 8:
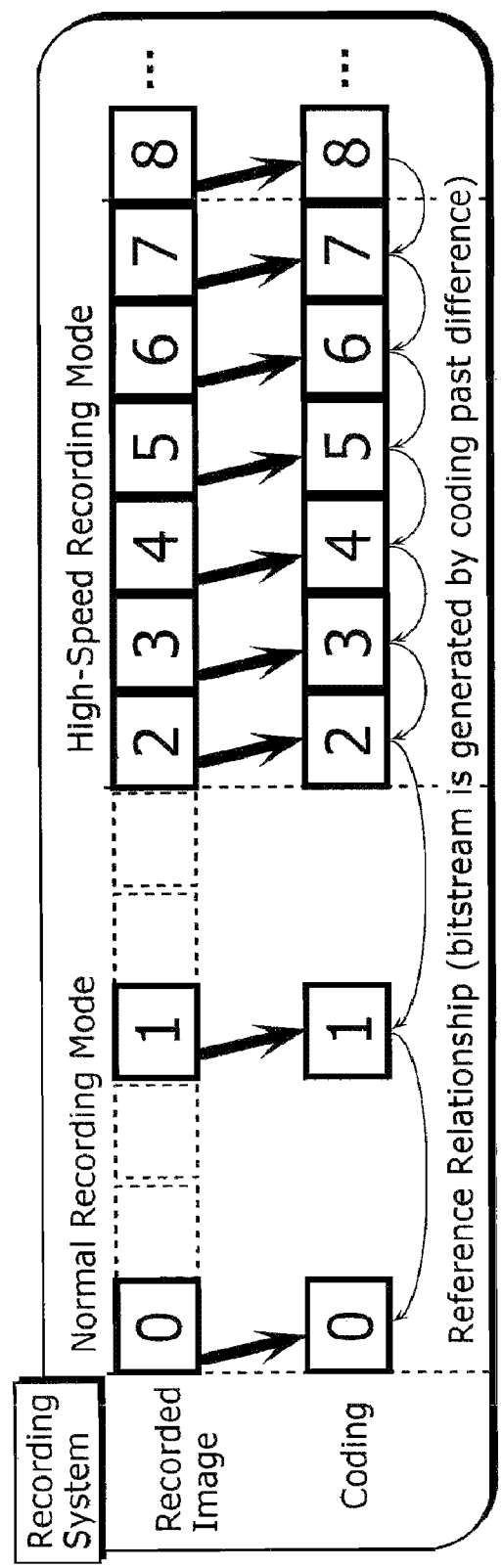
FIG. 8 is a diagram for explaining a conventional coding method of the video camera.
Figure 9:
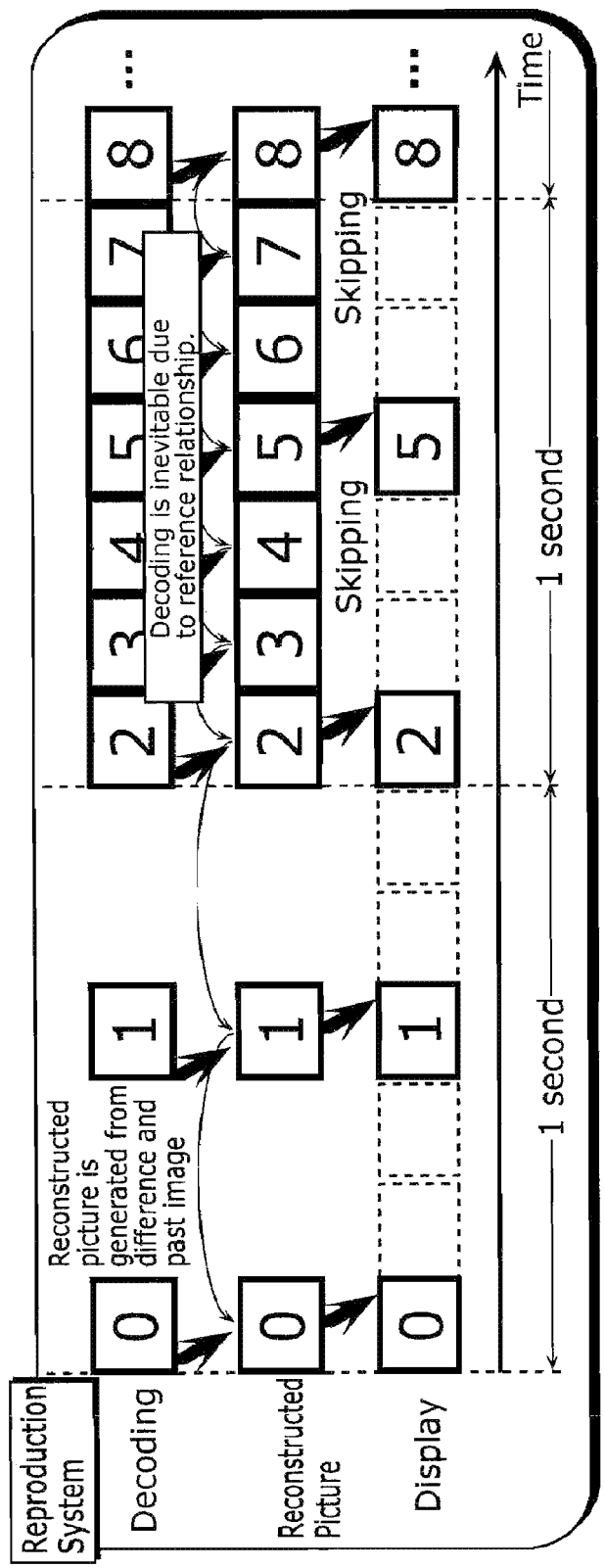
FIG. 9 is a diagram for explaining a decoding method of the video camera.
Figure 10:
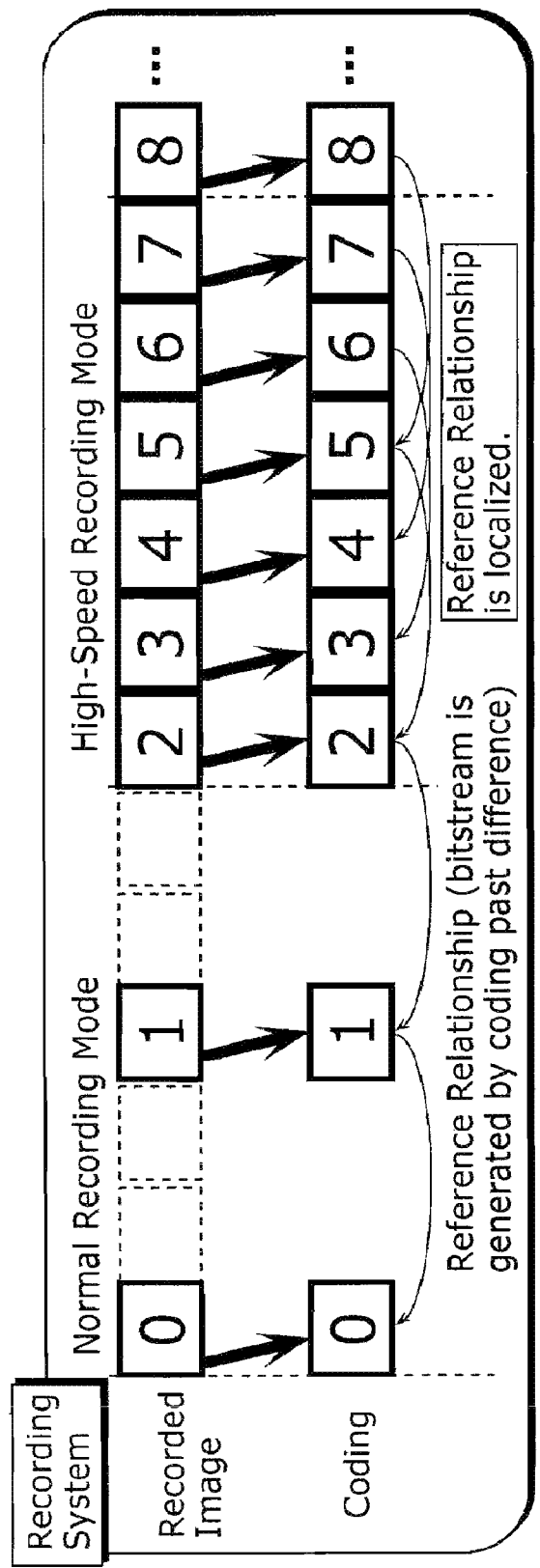
FIG. 10 is a diagram for explaining a coding method of the video camera.
Figure 11:
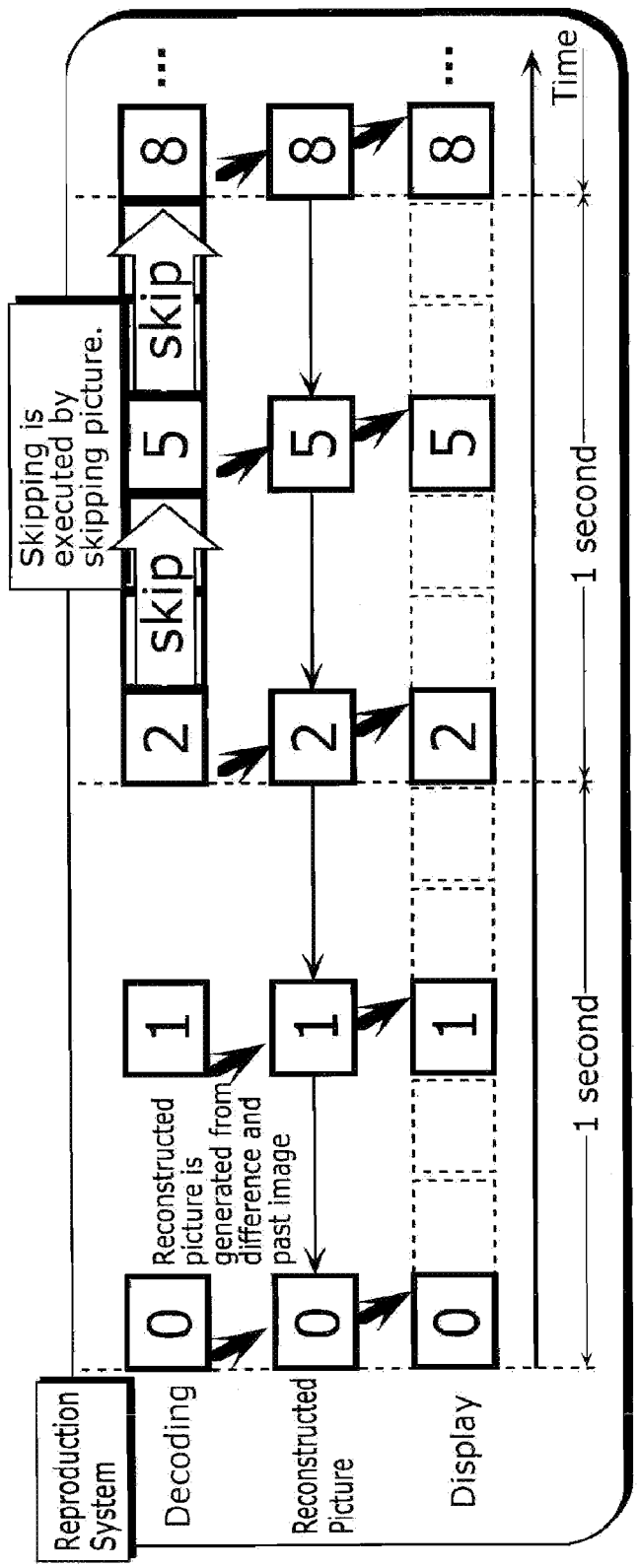
FIG. 11 is a diagram for explaining a decoding method of the video camera.
Figures 12, 13:
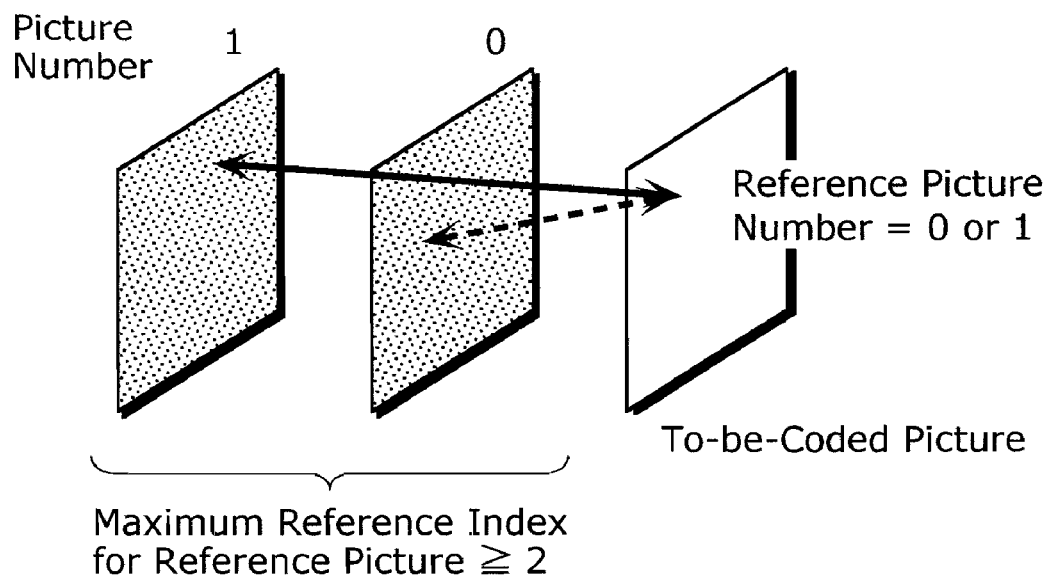
FIG. 12 is a diagram showing an example of the case where a maximum reference index for reference picture which is a reference range of a to-be-coded picture is equal to or more than 2.
FIG. 13 is a diagram showing coded data of a to-be-coded picture of FIG. 12.
Figure 14:
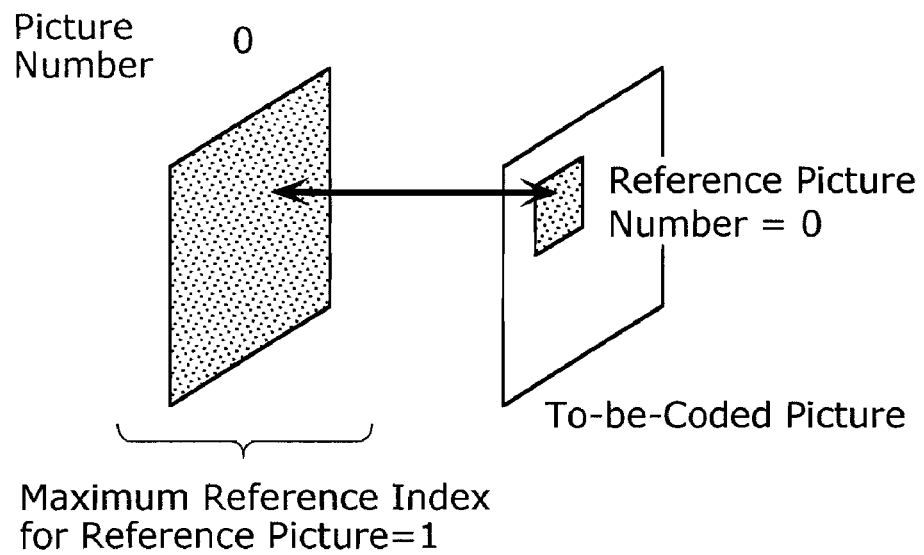
FIG. 14 is a diagram showing an example of the case where a maximum reference index for reference picture which is a reference range of a to-be-coded picture is 1.
Figure 15:
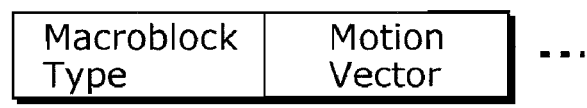
FIG. 15 is a diagram showing coded data of a to-be-coded picture of FIG. 14.

In FIG. 20, it is shown that, in a normal recording mode, two pictures are recorded within one second, and in a high-speed recording mode, six pictures are recorded within one second. In other words, two pictures are coded per second in the normal recording mode which is not the high-speed recording mode, and six pictures are coded per second in the high-speed recording mode. It should be noted that reference numerals of FIG. 5 are assigned to identical pictures and units in FIGS. 5 to 11.

Figure 21:
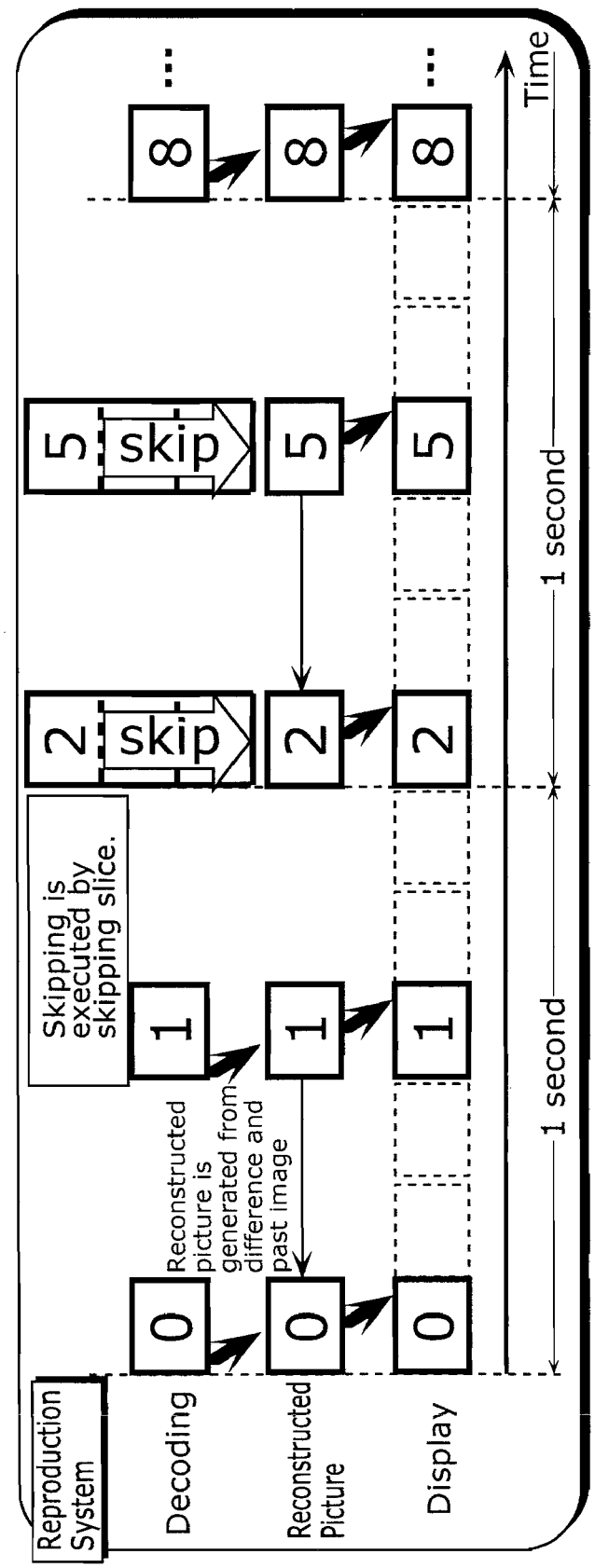
FIG. 21 is a diagram showing one example of the case where pictures coded in FIG. 20 are reproduced at a constant speed.

FIG. 21 is a diagram showing one example of the case where the pictures coded in FIG. 20 are reproduced at a constant speed. Here, the moving picture decoding device 20 which performs the reproduction of FIG. 21 is a decoding device which decodes only two pictures per second.

In FIG. 20, since the moving picture decoding device 20 which is a reproduction system can decode two pictures per second at maximum, the moving picture coding device 10 which is a recording system can combine three pictures. This is because, the moving picture decoding device 20 performs the skipped display of the constant-speed reproduction, when the moving picture coding device 10 combines three pictures together in the high-speed recording mode by which six pictures are recorded per second.

In the example of FIG. 20, in the high-speed recording mode, the pictures 2, 3, and 4 are sequentially combined into one combined to-be-coded picture having three slices, and then the pictures 5, 6, and 7 are also sequentially combined into another combined to-be-coded picture having three slices. In FIG. 20, for example, a combined to-be-coded picture 234 has three slices 2, 3, and 4, and another combined to-be-coded picture 567 has three slices 5, 6, and 7.

Thereby, it is possible to code the combined to-be-coded picture whose maximum reference index for reference picture is 1 while reference relationships of the combined to-be-coded picture are localized.

In the example of FIG. 21, the moving picture decoding device of FIG. 20 decodes and displays coded data of such a combined to-be-coded picture whose maximum reference index for reference picture is 1 and in which reference relationships are localized.

In FIG. 21, skipped display of constant-speed reproduction mode is performed. Images (pictures) recorded by the moving picture coding device 10 as a recording system during a time period of the normal recording mode are displayed after the moving picture decoding device 20 as a reproduction system directly decodes coded data of all of the pictures thereby generating reconstructed pictures. Each of images (pictures) records by the moving picture coding device 10 as a recording system during a time period of the high-speed recording mode are coded to have a plurality of localized reference relationships. The moving picture decoding device 20 as a reproduction system decodes only (i) a region (slice) 2 in a combined to-be-decoded picture 234 thereby generating a reconstructed picture 2 and (ii) a region (slice) 5 in a combined to-be-decoded picture 567 thereby generating a reconstructed picture 5, and then displays the generated reconstructed pictures 2 and 5 as pictures. Thereby, moving picture decoding device 20 can achieve the skipped display of constant-speed reproduction.

Here, the skipping processing for skip slices in the decoding is processing for searching a bit pattern indicating a starting slice of the slices, and has a processing load much smaller than processing for decoding pictures. Therefore, the skipping processing does not disturb the reproduction capability of the moving picture decoding device 20, which is reproduction of two pictures per second.

It should be noted that the above description with reference to FIG. 21 has been given for the constant-speed reproduction, but the same goes for cases of other reproduction modes such as 1/2 slow-speed mode, slow-speed mode, and 1/N speed mode. Thus, the other cases are not described herein. According to a table shown in FIG. 22, the moving picture decoding device 20 may decodes a region (slice) in a combined to-be-decoded picture thereby generating a reconstructed picture and then displays the generated reconstructed picture. Here, FIG. 22 is a table indicating the reproduction modes according to the first embodiment of the present invention and showing how to decode, as pictures, slices (slice numbers) in a combined to-be-decoded picture.

Next, the moving picture coding method (coding processing) and the moving picture decoding method (decoding processing) according to the first embodiment of the present invention are described.

Figure 23:
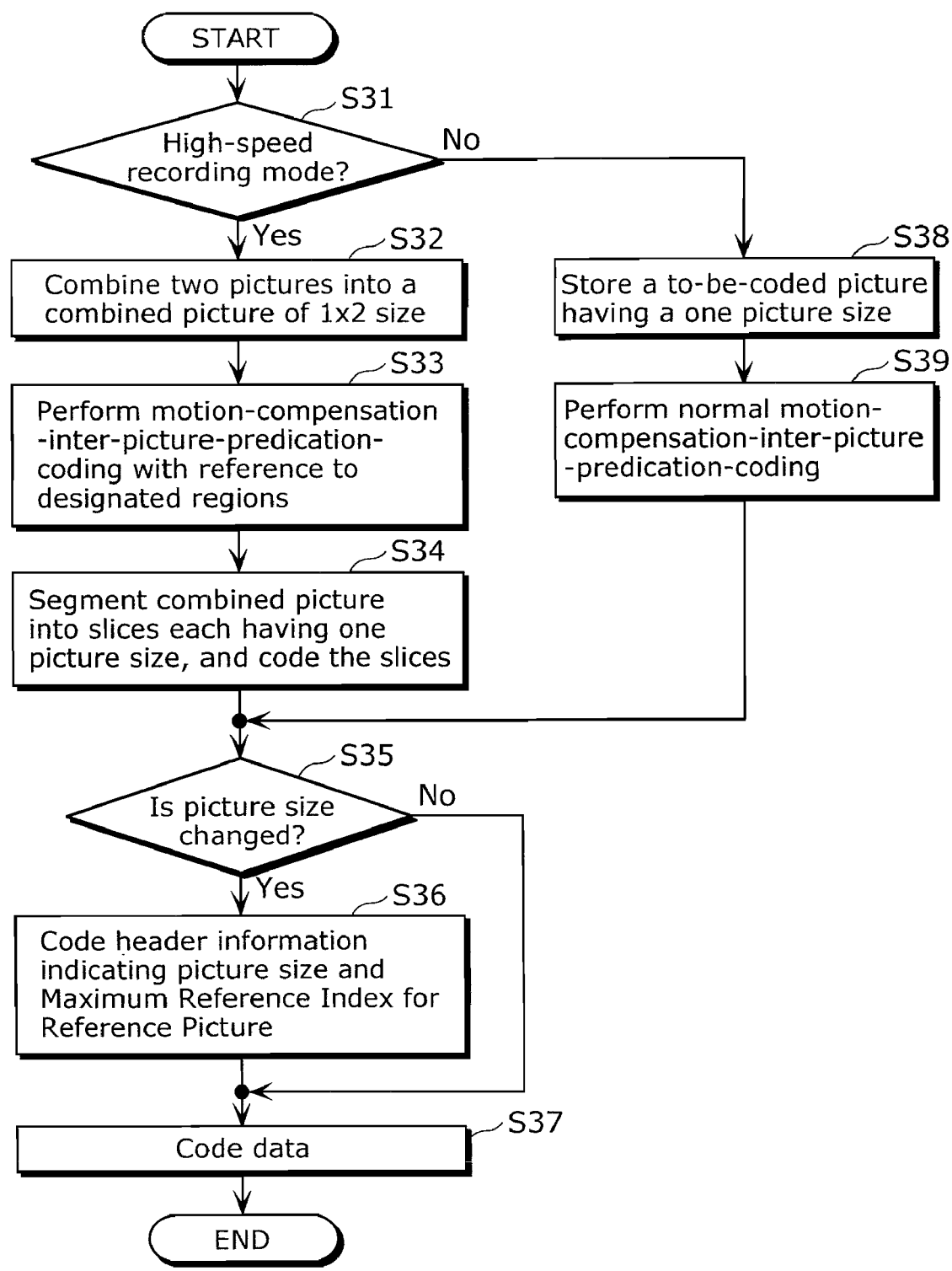
FIG. 23 is a flowchart for explaining moving picture coding method according to the first embodiment of the present invention.

FIG. 23 is a flowchart for explaining the moving picture coding method according to the first embodiment of the present invention. For the sake of simplicity of the description, it is assumed that the following moving picture coding method employs motion-compensation-inter-picture-predication-coding.

Firstly, the coding control unit 101 determines whether or not a is a high-speed recording mode (S31).

If it is determined that the recording mode is the high-speed recording mode (Yes at S31), then the combination unit 102 combines every two pictures included in a to-be-coded picture signal 112 into a combined to-be-coded picture of a 1×2 size according to instructions from the coding control unit 101, and then stores the resulting combined to-be-coded picture (S32).

Next, the coding control unit 101 provides the motion compensation unit 103 with an instruction signal 111 for designating is the combined to-be-coded picture and its reference picture so that there are localized reference relationships between them.

According to the instructions from the coding control unit 101, the motion compensation unit 103 performs motion-compensation-inter-picture-predication-coding on the combined to-be-coded picture of a 1×2 size which has been stored into the combination unit 102 in the high-speed recording mode, with reference to regions (slices) designated as the localized reference relationships (S33). For example, as shown in FIG. 19, the original to-be-coded pictures (slices) 1 and 3 have a localized reference relationship, and also the original to-be-coded pictures (slices) 2 and 4 have a localized reference relationship (S33).

Then, according to the instructions from the coding control unit 101, the variable length coding unit 105 segments the combined to-be-coded picture which has been generated by the combination performed by the combination unit 102 and DCT and quantization performed by the DCT quantization unit 104, into slices each having an original 1 picture size by slice boundaries 700 in a raster order, and then codes the slices (S34). As shown in the example of FIG. 19, a single combined to-be-coded picture is segmented into two slices, or as shown in the example of FIG. 20, a single combined to-be-coded picture is segmented into three slices.

Then, when all of the slices included in the single combined to-be-coded picture have been coded, in other words, when the single combined to-be-coded picture has been coded, the coding control unit 101 determines whether or not a picture size of this to-be-coded picture is changed from a picture size of an immediately-prior to-be-coded picture which has been coded immediately prior to this to-be-coded picture.

Then, if the picture size is changed (Yes at S35), then, according to the instructions from the coding control unit 101, the variable length coding unit 105 codes header information indicating the picture size and indicating that a maximum reference index for reference picture is 1 (S36).

Then, according to the instructions from the coding control unit 101, the variable length coding unit 105 performs variable length coding on the coded combined-to-be-coded picture together with the above coded header information, and outputs the resulting coded data as a coded data signal 117 (S37).

On the other hand, if it is determined at Step S35 that the picture size is not changed from the immediately-prior picture size (No at S35), then the variable length coding unit 105 skips Step S36, but proceeds to Step 37 to perform variable length coding on only the coded to-be-coded picture and output the resulting coded data as the coded data signal 117.

Moreover, at Step S31, if the recording mode is not the high-speed recording mode (No at S31), the combination unit 102 stores, as one to-be-coded picture, every picture included in the to-be-coded picture signal 112, according to the instructions from the coding control unit 101 (S38). Then, normal motion-compensation-inter-picture-predication-coding is performed on the to-be-coded picture.

As described above, the moving picture coding device 10 performs the coding processing.

Next, the moving picture decoding method according to the first embodiment is described.

Figure 24:
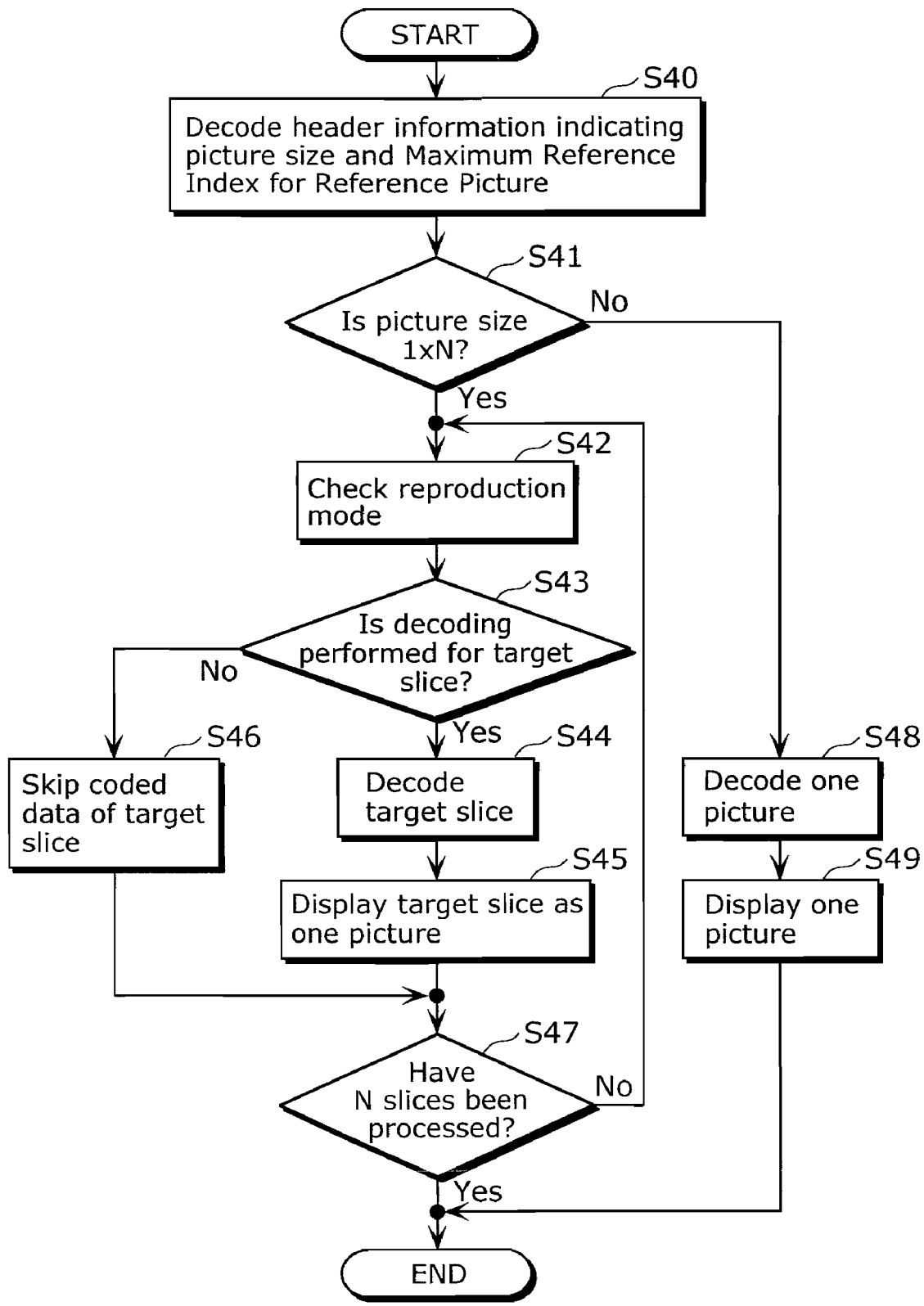
FIG. 24 is a flowchart for explaining moving picture decoding method according to the first embodiment of the present invention.

FIG. 24 is a flowchart for explaining the moving picture decoding method according to the first embodiment of the present invention.

Firstly, the variable length decoding unit 204 performs variable length decoding on header information indicating a picture size and a maximum reference index for reference picture of a to-be-decoded picture which is obtained from an inputted coded data signal 203 (S40).

Next, based on the header information decoded by the variable length decoding unit 204, the decoding control unit 201 determines whether or not the picture size of the to-be-decoded picture is a combined picture size (a 1×N size) (S41). For example, the decoding control unit 201 determines whether or not the picture size of the to-be-decoded picture is a 1×2 size which is a picture size in case of combining two pictures.

Then, if it is determined that the picture size of the to-be-decoded picture is the combined picture size such as a 1×N size (Yes at S41), then the decoding control unit 201 checks information of a reproduction mode instruction signal 200 for instructing a reproduction mode of the to-be-decoded picture (S42).

Based on the table of FIG. 22 indicating reproduction modes, the decoding control unit 201 performs reproduction of the to-be-decoded picture in the designated reproduction mode. In more detail, based on the table of FIG. 22 indicating reproduction modes, the decoding control unit 201 determines whether or not one to-be-decoded slice (hereinafter, the single to-be-decoded slice is referred to as a "single target slice") included in the to-be-decoded picture is to be decoded (S43).

If it is determined that the single target slice is to be decoded (Yes at S43), then the decoding control unit 201 instructs the variable length decoding unit 204, the motion compensation unit 206, and the inverse DCT/inverse quantization unit 205 to decode the single target slice and display the decoded single target slice as one picture. According to the instructions from the decoding control unit 201, the variable length decoding unit 204, the motion compensation unit 206, and the inverse DCT/inverse quantization unit 205 decode the single target slice in the input coded data signal 203 and display the decoded single target slice as one picture (S45).

On the other hand, if it is determined based on the table of FIG. 22 indicating reproduction modes that the single target slice is not to be decoded (No at S43), then processing for decoding coded data of the single target slice is skipped (S46).

Then, if it is determined that all of the slices included in the to-be-decoded picture have been processed (Yes at S47), then the processing for decoding the one to-be-decoded picture having a 1×N size has been completed.

On the other hand, it is determined that all of the slices included in the to-be-decoded picture have not been processed (No at S47), then the processing from Step S41 to Step S46 is repeated for a still remained slice.

Moreover, if it is determined at Step S41 that the picture size of the to-be-decoded picture is not a combined picture size (No at S41), then the decoding control unit 201 instructs the variable length decoding unit 204, the motion compensation unit 206, and the inverse DCT/inverse quantization unit 205 to decode directly the to-be-decoded picture having a 1 picture size and display the decoded picture as one picture. According to the instructions from the decoding control unit 201, the variable length decoding unit 204, the motion compensation unit 206, and the inverse DCT/inverse quantization unit 205 decode the to-be-decoded picture included in the input coded data signal 203 as one picture (S48) and display the decoded picture as one picture (S49).

As described above, the moving picture decoding device 20 performs the decoding processing.

As explained above, according to the first embodiment of the present invention, every two to-be-coded pictures are combined into a combined picture having a 1×2 size for example, and then motion-compensation-inter-picture-predication-coding is performed on the combined picture with reference to reference regions (slices in a reference picture) having localized reference relationships with regions (slices, or original to-be-coded pictures) in the to-be-coded picture for skipped display. Thereby, according to the first embodiment of the present invention, it is possible to set a maximum reference index for reference picture of the to-be-coded picture to be always 1 (in other words, even a combined to-be-coded picture is coded with reference to the nearest combined to-be-coded picture in a coding order). Thereby, information of a reference index for reference picture which is included in coded data of each macroblock becomes unnecessary, which makes it possible to realize the moving picture coding device 10 which can prevent increase of an amount of the coded data.

In addition, the first embodiment of the present invention using that, in the skipped display, a dependency relationship (reference relationship) between slices exists only between slices to be displayed. More specifically, when decoding coded data in which a plurality of pictures are combined as a plurality of slices into one picture in the coding processing, it is possible in the decoding processing to skip decoding of a slice not to be displayed within a to-be-displayed picture. Thereby, even the decoding device having insufficient processing capability can perform skipped display.

Thus, according to the first embodiment of the present invention, it is possible to realize the moving picture coding device and the moving picture decoding device so that, even if the moving picture decoding device has insufficient processing capability, the moving picture decoding device can perform skipped display and that increase of an amount of coded data can be suppressed.

It should be noted that, in the first embodiment, the description has been given for the case where to-be-coded pictures are combined into a combined to-be-coded picture of a 1×2 or 1×3 size for the sake of simplicity of the description, but the same goes for other cases where a picture size is a 1×N (N is a natural number) size. It should also be noted that the reference relationship may be established only between slices which are pictures to be displayed in skipped display (to-be-displayed slices, or to-be-displayed pictures), and establishing of a reference relationship between slices which are not to-be-displayed slices may be arbitrary. It should also be noted that, in MPEG-4AVC, the above can be achieved even in the case where a picture size is a M×N (M is a natural number) size.

(Second Embodiment)

Figure 25:
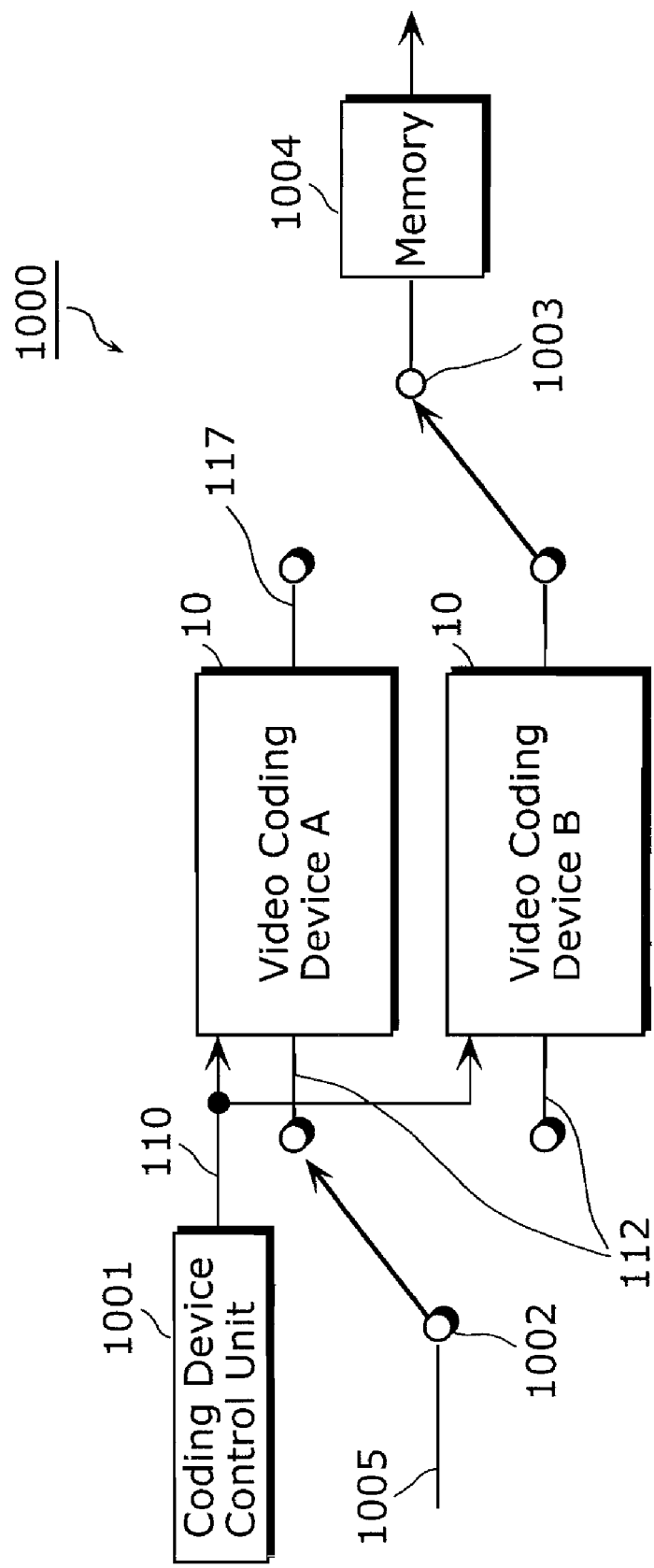
FIG. 25 is a diagram showing a structure of a moving picture coding system according to the first embodiment of the present invention.

FIG. 25 is a diagram showing a structure of a moving picture coding system 1000 according to the second embodiment of the present invention.

The moving picture coding system 1000 which is a recording system has two moving picture coding devices 10, a coding device control unit 1001, a first selection unit 1002, a second selection unit 1003, and a memory 1004. Here, the reference numerals of FIG. 16 are assigned to identical units of FIG. 25. Therefore, detailed explanation for the identical units is not repeated again below.

As shown in FIG. 25, the moving picture coding system 1000 has two moving picture coding devices 10 each of which has been described in the first embodiment (hereinafter, they are referred to as a "moving picture coding device A10" and a "moving picture coding device B10", respectively). To-be-coded picture data 1005 is sorted as the to-be-coded picture signals 112 by the first selection unit 1002 into the moving picture coding device A10 and the moving picture coding device B10. The moving picture coding method (coding processing) described in the first embodiment is performed on the input to-be-coded picture signal 112 by the moving picture coding device A10 and the moving picture coding device B10 in parallel. Then, the second selection unit 1003 selects a coded data signal 117 outputted from the moving picture coding device A10 or a coded data signal 117 outputted from the moving picture coding device B10, in order to be stored in the memory 1004 as one coded data.

The coding device control unit 1001 instructs the moving picture coding device A10 and the moving picture coding device B10 to perform the moving picture coding processing. In addition, the coding device control unit 1001 controls the first selection unit 1002 and the second selection unit 1003 to perform the respective above-described processing. As one example, it is also possible that, in the case where there are reference relationships as shown in FIG. 19, the pictures 1 and 2 are inputted to the moving picture coding device A10, and the pictures 3 and 4 are inputted to the moving picture coding device B10. Thereby, it is possible to operate the moving picture coding device A10 and the moving picture coding device B10 in parallel, which makes it possible to improve efficiency of the moving picture coding processing.

It should be note that, as far as a to-be-coded picture is a combined picture having a 1×N size, the moving picture coding system 1000 can perform the parallel processing by N moving picture coding devices 10 at maximum, which makes it possible to improve efficiency of the moving picture coding processing. However, it is necessary to sort to-be-coded pictures into a plurality of the moving picture coding devices 10 so that reference relationships among them are not disconnected by the sorting.

(Third Embodiment)

Figure 26:
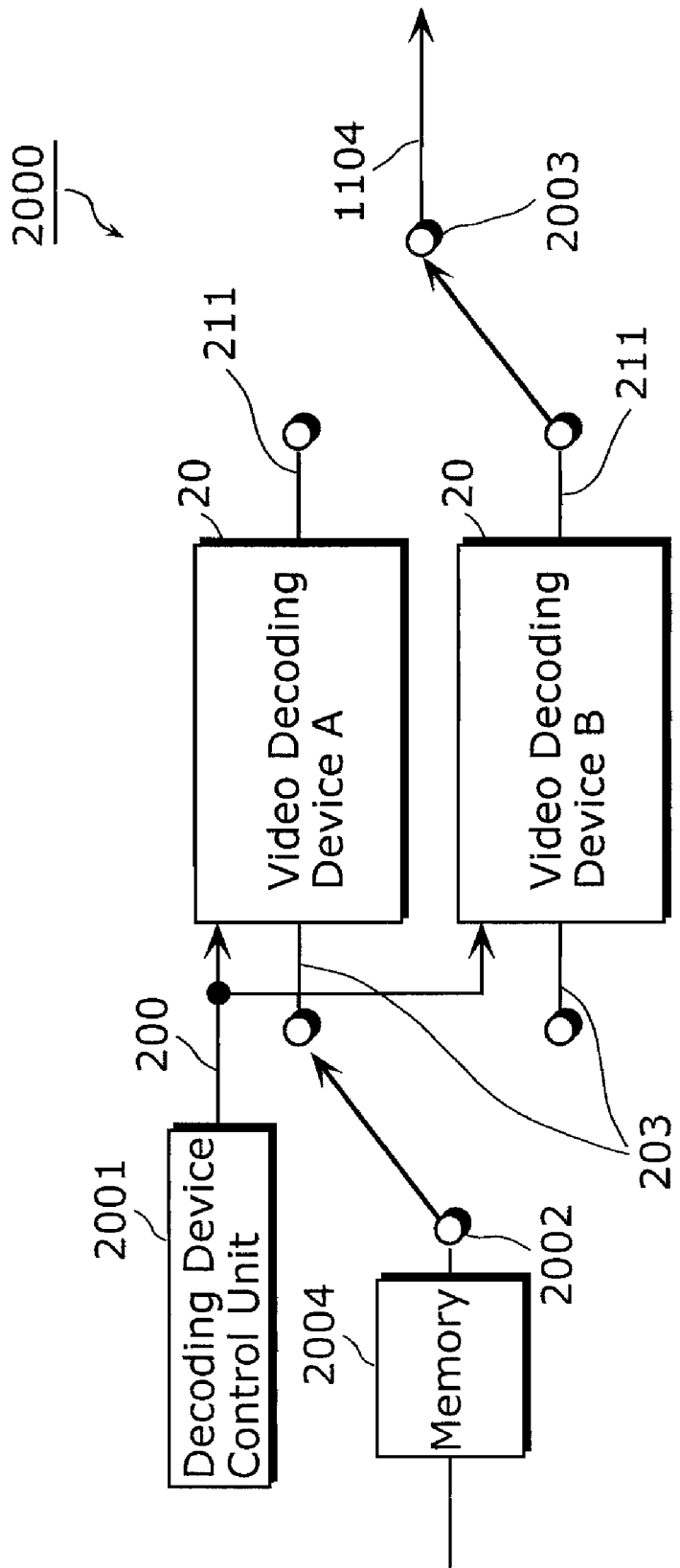
FIG. 26 is a diagram showing a structure of a moving picture 1o decoding system according to the third embodiment of the present invention.

FIG. 26 is a diagram showing a structure of a moving picture decoding system 2000 according to the third embodiment of the present invention.

The moving picture decoding system 2000 which is a reproduction system includes two moving picture decoding devices 20, a decoding device control unit 2001, a third selection unit 2002, a fourth selection unit 2003, and a memory 2004. Here, the no reference numerals of FIG. 17 are assigned to identical units of FIG. 26. Therefore, detailed explanation for the identical units is not repeated again below.

As shown in FIG. 26, the moving picture decoding system 2000 has two moving picture decoding devices 20 each of which has is been described in the first embodiment (hereinafter, they are referred to as a "moving picture decoding device A20" and a "moving picture decoding device B20", respectively).

In the moving picture decoding system 2000, coded data is read out per slice, from the memory 2004 in which the coded data is stored. The coded data which is read out per slice by the third selection unit 2002 is sorted as a coded data signal 203 into the moving picture decoding device A20 and the moving picture decoding device B20. The moving picture decoding method described in the first embodiment is performed on the input coded data signal 203 by the moving picture decoding device A20 and the moving picture decoding device B20 in parallel. The fourth selection unit 2003 selects a to-be-displayed picture signal 211 outputted from the moving picture decoding device A20 or a to-be-displayed picture signal 211 outputted from the moving picture decoding device B20, in order to be outputted. Thereby, the moving picture decoding system 2000 can improve efficiency of the moving picture decoding processing.

It should be note that, as far as the coded data is data of a combined picture having a 1×N size, the moving picture decoding system 2000 can perform the parallel processing by N moving picture decoding devices 20 at maximum, which makes it possible to improve efficiency of the moving picture decoding processing.

(Fourth Embodiment)

Figure 27:
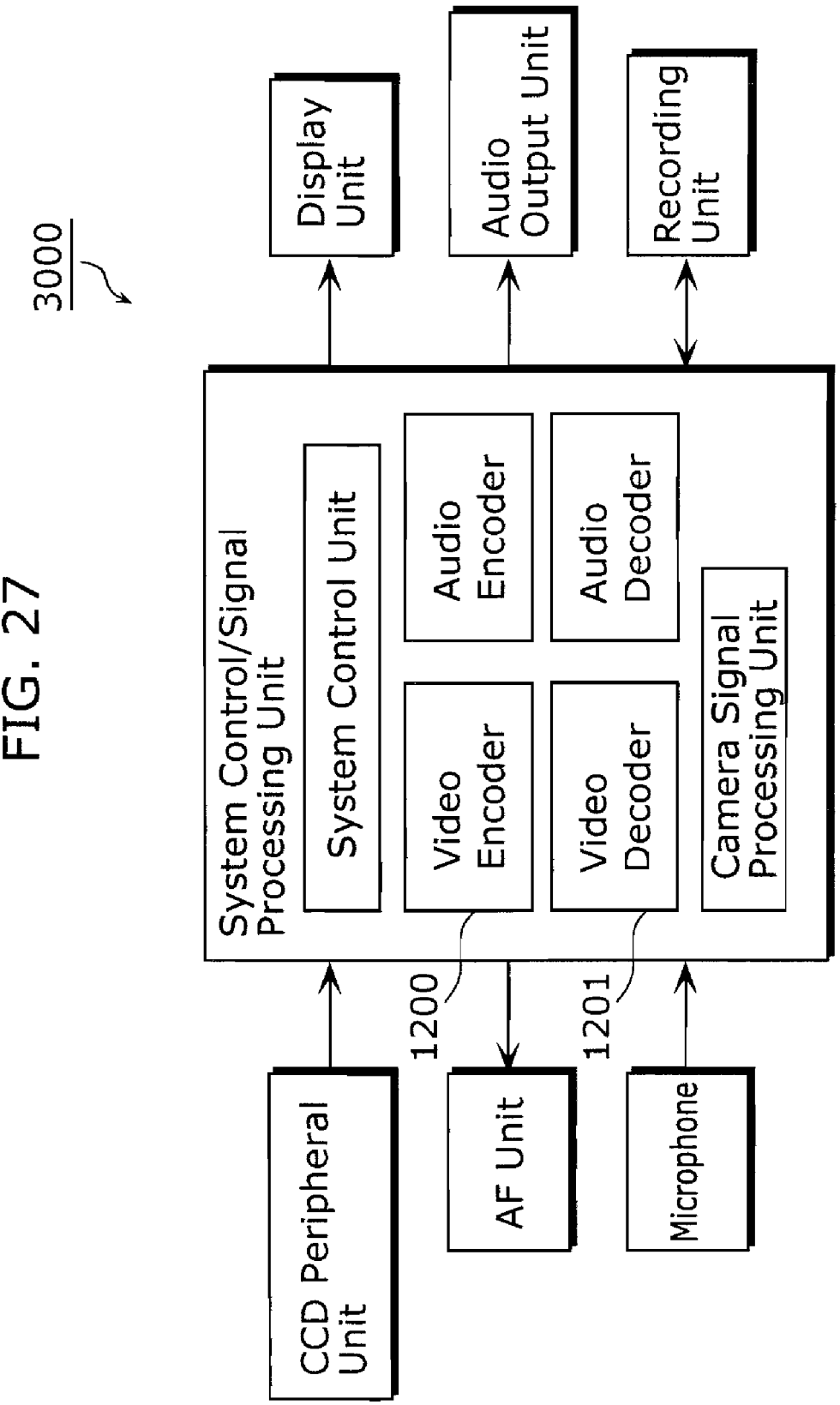
FIG. 27 is a diagram showing one example of a structure of a video system according to the fourth embodiment of the present invention.

FIG. 27 is a diagram showing one example of a video system 3000 according to the fourth embodiment of the present invention.

In FIG. 27, for example, the video system 3000 includes a CCD peripheral unit, an auto focus (AF) unit, a microphone, a system control/signal processing unit, a display unit, an audio output unit, and a recording unit. Here, the CCD peripheral unit and the microphone are audio/visual (AV) input interfaces. The display unit, the audio output unit, and the recording unit are AV output interfaces.

The video system 3000 shown in FIG. 27 is one example of a moving picture recording/reproducing system in which the moving picture coding device and the moving picture decoding device according to the present invention are used. In the example of FIG. 27, the system control/signal processing unit includes a system control unit, a video encoder 1200, a video decoder 1201, an audio encoder, an audio decoder, and a camera signal processing unit. The video encoder 1200 corresponds to the moving picture coding device described in the first embodiment of the present invention, and the video decoder 1201 corresponds to the moving picture decoding device described in the first embodiment of the present invention.

Figure 28:
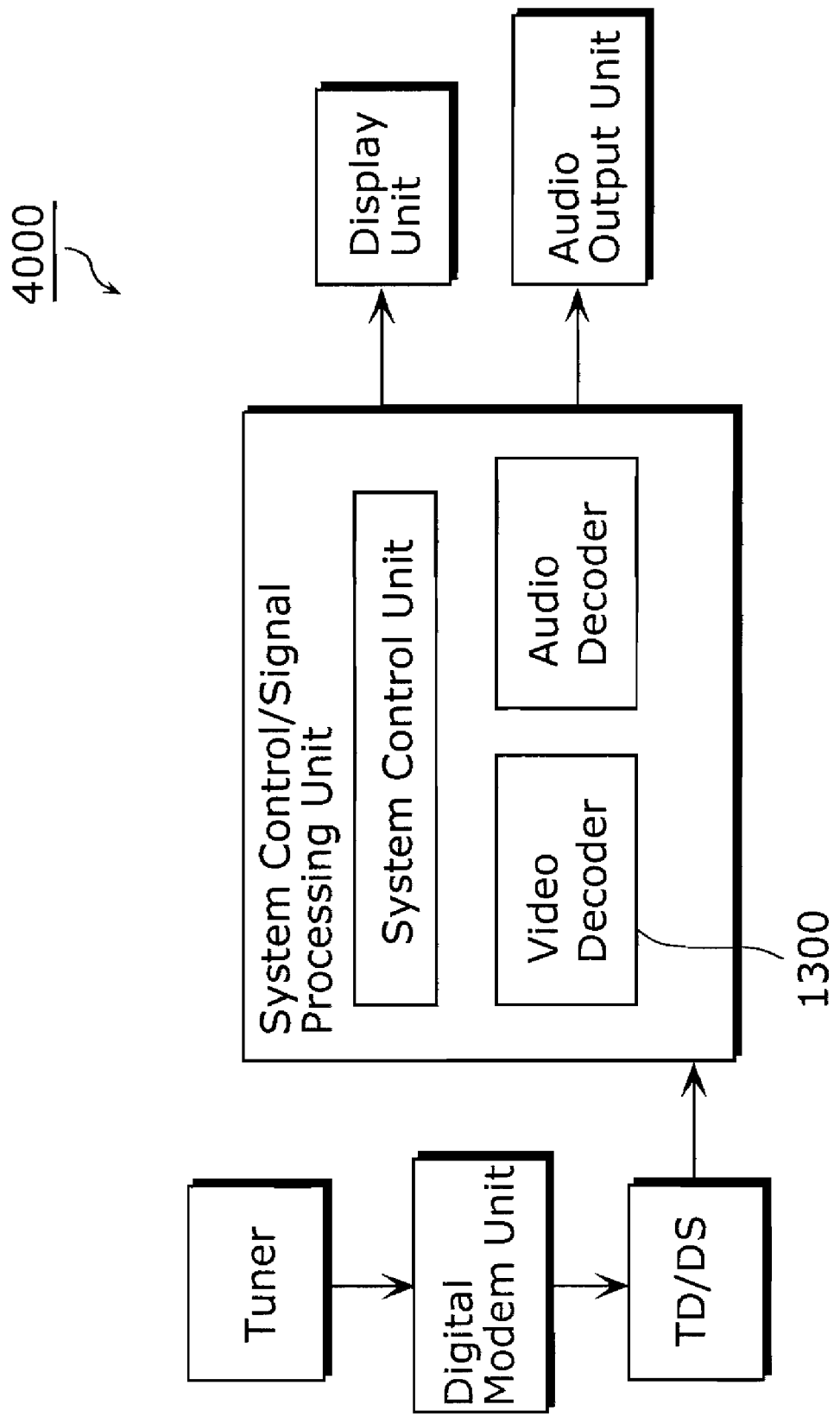
FIG. 28 is a diagram showing one example of a digital television system according to the fourth embodiment of the present invention.

FIG. 28 is a diagram showing one example of a digital television system 40000 according to the fourth embodiment of the present invention.

In FIG. 28, for example, the digital television system 40000 includes a tuner, a digital modem unit, a TD/DS unit, a system control/signal processing unit, a display unit, and an audio output unit.

The TD/DS unit performs descrambling and decoding of a transport stream.

The digital modem unit performs modulation and demodulation on signals from the tuner.

The display unit and the audio output unit output decoded video and audio.

The digital television system 4000 of FIG. 28 is one example of a moving picture reproduction system in which the moving picture decoding device according to the first embodiment of the present invention is used. In the example of FIG. 28, the system control/signal processing unit includes a system control unit, a video decoder 1300, and an audio decoder. The video decoder 1300 corresponds to the moving picture decoding device according to the first embodiment of the present invention.

As described above, according to the above embodiments of the present invention, it is possible to realize the moving picture coding device and the moving picture decoding device so that, even if the moving picture decoding device has insufficient processing capability, the moving picture decoding device can perform skipped display and that increase of an amount of coded data can be suppressed.

The moving picture coding device and the moving picture coding method according to the present invention can suppress increase of an amount of coded data, so that the present invention is useful to prolong a recording period of a video camera or the like which performs high-speed recording. Furthermore, the moving picture decoding device and the moving picture decoding method according to the present invention enable a decoding device with insufficient processing capability to perform skipped display easily, so that the present invention is useful to reduce power consumption and cost of the moving picture reproduction system.

It should be noted that, in a moving picture recording/reproducing system in which the moving picture coding device and the moving picture decoding device according to the present invention are used, a plurality of to-be-coded pictures are combined as slices into one combined to-be-coded picture of a 1×N size. However, the moving picture recording/reproducing system may include a code conversion device which extracts one slice having a reference relationship from coded data of the combined to-be-coded picture, and then converts a slice header of the slice into a picture header. In the above case, it is possible to generate coded data in which pictures have already been skipped. Thereby, it is possible to generate coded data for which even a decoding device having insufficient processing capability can perform skipped display.

The moving picture recording/reproducing system may also include a code conversion device which converts slice headers of all of the slices, not a slice header of only one slice, into picture headers. In the above case, it is possible to generate coded data from which moving pictures can be reproduced, without the moving picture decoding device according to the present invention. More specifically, in MPEG-4AVC, such code conversion can be performed easily without influence to a part on and under a macroblock layer in coded data, even when the code conversion device performs alignment adjustment of coded data according to to-be-decoded picture size information, information for deciding to-be-displayed picture order, and information of a change in an address of the first macroblock in a slice.

Thus, the above description has been given for the moving picture coding device, the moving picture coding method, the moving picture decoding device, and the moving picture decoding method according to the present invention, but the present invention is not limited to them. Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

It should be noted that the present invention can be realized not only as the above-described devices, methods, and systems, but also as: an integrated circuit which includes the processing units of the device; a system which includes the device; a method which includes steps performed by the processing units of the device; a program which causes a computer to execute the steps; information indicating the program; and the like. Off course, the program and is the information may be distributed via a recording medium such as a CD-ROM or a communication medium such as the Internet.

Figure 29:
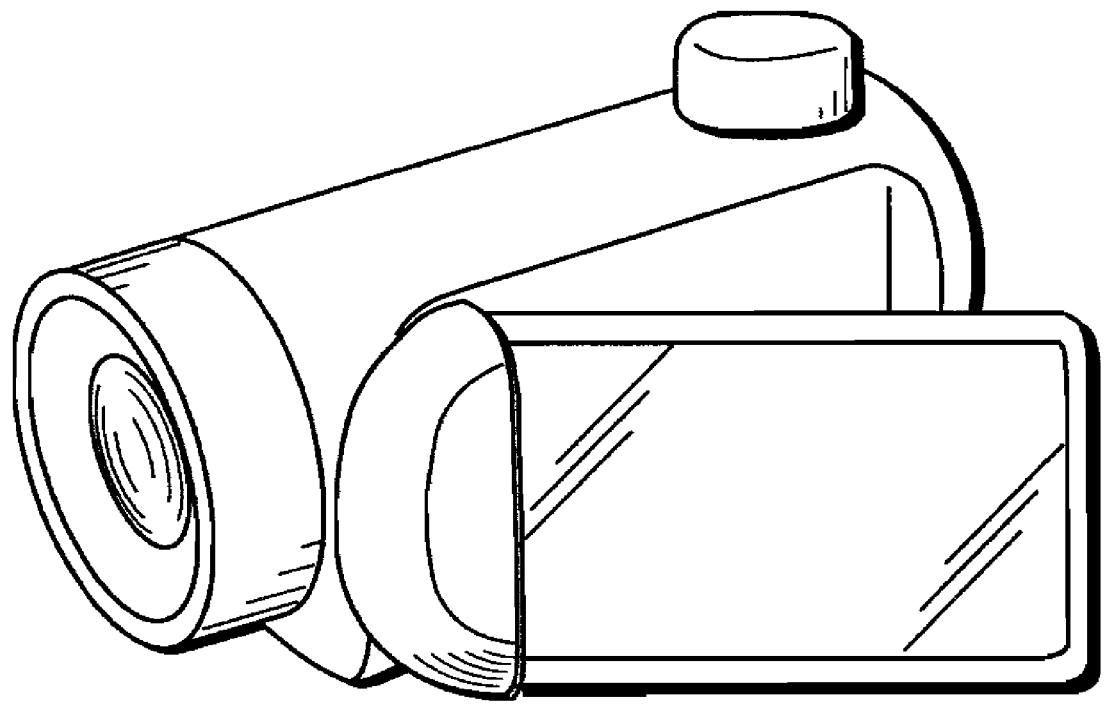
FIG. 29 is an external view of one example of the video camera capable of the high-speed recording.

The present invention can be used for the moving picture coding device, the moving picture coding method, the moving picture decoding device, and the moving picture decoding method, and more particularly for a video camera as shown in FIG. 29 which performs high-speed recording and a system which reproduces images recorded by the video camera.

What is claimed is:

1. A moving picture coding method for coding a moving picture stream, comprising:
generating a plurality of combined pictures each of which being generated by combining a plurality of pictures into a single combined picture having the plurality of pictures as combined slice regions, the plurality of pictures being included in the moving picture stream, and each of the plurality of pictures corresponding to one screen when displayed;
coding the plurality of the combined pictures; and
setting a slice boundary between the slice regions in the combined picture,
wherein each of the slice regions corresponds to one screen when displayed, and
in the coding, for each of the plurality of combined pictures, when the combined picture has one or more to-be-displayed slice regions except at least one not-to-be-displayed slice region and the one or more to-be-displayed slice regions are displayed for skipped reproduction, a to-be-displayed slice region is coded with reference to only a corresponding to-be-displayed slice region of another combined picture different from the combined picture, the to-be-displayed slice region being among the one or more to-be-displayed slice regions included in the combined picture, and the to-be-displayed slice region having a reference relationship only with the corresponding slice region which corresponds to the to-be-displayed slice region and is among one or more to-be-displayed slice regions included in the other combined picture.

2. The moving picture coding method according to claim 1, wherein, in the coding of the plurality of the combined pictures, the to-be-displayed slice region is coded with reference to a to-be-displayed slice region included in another combined picture which is the nearest to the combined picture in a coding order.

3. The moving picture coding method according to claim 1, wherein the coding of the plurality of the combined pictures includes coding a picture size indicating the number of the plurality of pictures combined into the combined picture.

4. A moving picture decoding method of decoding a coded moving picture stream, comprising:
specifying a picture size of a to-be-decoded picture included in the coded moving picture stream, and determining based on the specified picture size whether or not the to-be-decoded picture is a combined picture which is generated by combining a plurality of pictures as slices of a single combined picture, each of the plurality of pictures corresponding to one screen when displayed; and
decoding at least one of the slices included in the to-be-decoded picture and reconstructing the decoded slice as a picture, when the determination is made that the to-be-decoded picture is the combined picture, each of the at least one of the slices corresponding to one screen when displayed,
wherein, for each of the plurality of combined pictures, when the combined picture has one or more to-be-displayed slice regions except at least one not-to-be-displayed slice region and the one or more to-be-displayed slice regions are displayed for skipped reproduction, a to-be-displayed slice region is coded with reference to only a corresponding slice region of another combined picture different from the combined picture, the to-be-displayed slice region being among the one or more to-be-displayed slice regions included in the combined picture, and the to-be-displayed slice region having a reference relationship only with the corresponding slice region which corresponds to the to-be-displayed slice region and is among one or more to-be-displayed slice regions included in the other combined picture.

5. The moving picture decoding method according to claim 4,
wherein the decoding of at least one of the slices includes:
when the to-be-decoded picture is the combined picture and has one or more to-be-displayed slice except at least one not-to-be-displayed slice, (i) decoding the to-be-displayed slice with reference to only a corresponding to-be-displayed slice of another combined picture, the to-be-displayed slice corresponding to one screen when displayed, and (ii) reconstructing the decoded slice as a picture, the one or more to-be-displayed slice being displayed for skipped reproduction; and
skipping decoding of the not-to-be-displayed slice except the to-be-displayed slice in the another combined picture.

6. The moving picture decoding method according to claim 4,
wherein the decoding of at least one of the slices includes:
decoding the to-be-decoded picture, when the determination is made that the to-be-decoded picture is not the combined picture, the to-be-decoded picture corresponding to one screen when displayed.

7. The moving picture decoding method according to claim 6, wherein the decoding of the at least one of the slices includes:
when the to-be-decoded picture has one or more to-be-displayed picture except at least one not-to-be-displayed picture, decoding, as a picture, a slice to be displayed among the to-be-decoded picture, the one or more to-be-displayed picture being displayed for skipped reproduction, and the slice corresponding to one screen when displayed.

8. A moving picture coding device which codes a moving picture stream, comprising:
a combination unit operable to generate a plurality of combined pictures each of which being generated by combining a plurality of pictures into a single combined picture having the plurality of pictures as combined slice regions, the plurality of pictures being included in the moving picture stream, and each of the plurality of pictures corresponding to one screen when displayed;
a coding unit operable to code the plurality of the combined pictures; and
a slice boundary setting unit operable to set a slice boundary between the slice regions in the combined picture,
wherein each of the slice regions corresponds to one screen when displayed, and
for each of the plurality of combined pictures, when the combined picture has one or more to-be-displayed slice regions except at least one not-to-be-displayed slice region, and the one or more to-be-displayed regions are displayed for skipped reproduction, the coding unit is operable to code a to-be-displayed slice region with reference to only a corresponding to-be-displayed slice region of another combined picture different from the combined picture, the to-be-displayed slice region being among the one or more to-be-displayed slice regions included in the combined picture, and the to-be-displayed slice region having a reference relationship only with the corresponding slice region which corresponds to the to-be-displayed slice region and is among one or more to-be-displayed slice regions included in the other combined picture.

9. A moving picture decoding device which decodes a coded moving picture stream, comprising:
a determination unit operable to specify a picture size of a to-be-decoded picture included in the coded moving picture stream, and determine based on the specified picture size whether or not the to-be-decoded picture is a combined picture which is generated by combining a plurality of pictures as slices of a single combined picture, each of the plurality of pictures corresponding to one screen when displayed; and
a decoding unit operable to decode at least one of the slices included in the to-be-decoded picture and reconstruct the decoded slice as a picture, when the determining unit determines that the to-be-decoded picture is the combined picture, each of the at least one of the slices corresponding to one screen when displayed,
wherein, for each of the plurality of combined pictures, when the combined picture has one or more to-be-displayed slice regions except at least one not-to-be-displayed slice region and the one or more to-be-displayed slice regions are displayed for skipped reproduction, a to-be-displayed slice region is coded with reference to only a corresponding slice region of another combined picture different from the combined picture, the to-be-displayed slice region being among the one or more to-be-displayed slice regions included in the combined picture, and the to-be-displayed slice region having a reference relationship only with the corresponding slice region which corresponds to the to-be-displayed slice region and is among one or more to-be-displayed slice regions included in the other combined picture.

10. A moving picture coding system, comprising:
a plurality of moving picture coding devices each of which codes a moving picture stream, the moving picture coding device including: a combination unit operable to generate a plurality of combined pictures each of which being generated by combining a plurality of pictures into a single combined picture having the plurality of pictures as combined slice regions,
the plurality of pictures being included in the moving picture stream, and each of the plurality of pictures corresponding to one screen when displayed;
a coding unit operable to code the plurality of the combined pictures;
a slice boundary setting unit operable to set a slice boundary between the slice regions in the combined picture,
wherein, for each of the plurality of combined pictures, when the combined picture has one or more to-be-displayed slice region except at least one not-to-be-displayed slice region, the coding unit is operable to code the to-be-displayed slice region with reference to only a corresponding to-be-displayed slice region of another combined picture, the one or more to-be-displayed slice region being displayed for skipped reproduction;
a dividing unit operable to divide one picture data into a plurality of divided picture data, and input the plurality of divided picture data into the plurality of moving picture coding devices, respectively;
a unification unit operable to unify a plurality of coded picture data outputted by the plurality of moving picture coding devices into one coded picture data; and
a coding device control unit operable to (i) output respective information regarding the plurality of divided picture data to be inputted into the plurality of moving picture coding devices, to the plurality of moving picture coding devices, respectively, and (ii) control the dividing unit and the unification unit to perform the dividing and the unifying, respectively.

11. A moving picture decoding system, comprising:
a plurality of moving picture decoding devices each of which decodes a coded moving picture stream, the moving picture decoding device including:
a determination unit operable to specify a picture size of a to-be-decoded picture included in the coded moving picture stream, and determine based on the specified picture size whether or not the to-be-decoded picture is a combined picture which is generated by combining a plurality of pictures as slices of the combined picture, each of the plurality of pictures corresponding to one screen when displayed;
a decoding unit operable to decode at least one of the slices included in the to-be-decoded picture and reconstruct the decoded slice as a picture, when the determining unit determines that the to-be-decoded picture is the combined picture, each of the at least one of the slices corresponding to one screen when displayed;
a dividing unit operable to divide one coded picture data into a plurality of divided picture data and input the plurality of divided picture data into the plurality of moving picture decoding devices, respectively;

a storage unit operable to store decoded picture data outputted by the plurality of moving picture decoding devices, and output a picture selected from a plurality of to-be-displayed pictures of the decoded picture data, one or more of the plurality of to-be-displayed pictures are displayed for skipped reproduction; and a decoding device control unit operable to (i) output respective designation information for designating a display speed at which a to-be-decoded picture is to be displayed by a display device, to the plurality of moving picture decoding device, respectively, the to-be-decoded picture being decoded and being included in the coded picture data to be inputted into the plurality of moving picture decoding devices and (ii) control the dividing unit and the selection unit to perform the dividing and the selecting, respectively, wherein one picture is selected from the plurality of to-be-displayed pictures of the decoded picture data stored in the storage unit, and the selected one picture is outputted.

12. An integrated circuit which codes a moving picture stream, comprising:

a combination unit operable to combine a plurality of pictures included in the moving picture stream into a single combined picture having the plurality of pictures as combined slice regions, the combining being performed to generate a plurality of the combined pictures which are included in the moving picture stream, and each of the plurality of pictures corresponding to one screen when displayed;

a coding unit operable to code the plurality of the combined pictures; and a slice boundary setting unit operable to set a slice boundary between the slice regions in the combined picture, wherein each of the slice regions corresponds to one screen when displayed, and for each of the plurality of combined pictures, when the combined picture has one or more to-be-displayed slice regions except at least one not-to-be-displayed slice region and the one or more to-be-displayed slice regions are displayed for skipped reproduction, the coding unit is operable to code a to-be-displayed slice region with reference to only a corresponding to-be-displayed slice region of another combined picture different from the combined picture, the to-be-displayed slice region being among the one or more to-be-displayed slice regions included in the combined picture, and the to-be-displayed slice region having a reference relationship only with the corresponding slice region which corresponds to the to-be-displayed slice region and is among one or more to-be-displayed slice regions included in the other combined picture.

13. An integrated circuit which decodes a coded moving picture stream, comprising:

a determination unit operable to specify a picture size of a to-be-decoded picture included in the coded moving picture stream, and determine based on the specified picture size whether or not the to-be-decoded picture is a combined picture which is generated by combining a plurality of pictures as slices of a single combined picture, each of the plurality of pictures corresponding to one screen when displayed; and a decoding unit operable to decode at least one of the slices included in the to-be-decoded picture and reconstruct the decoded slice as a picture, when the determining unit determines that the to-be-decoded picture is the combined picture, each of the at least one of the slices corresponding to one screen when displayed, wherein for each of the plurality of combined pictures, when the combined picture has one or more to-be-displayed slice regions except at least one not-to-be-displayed slice region and the one or more to-be-displayed slice regions are displayed for skipped reproduction, a to-be-displayed slice region is coded with reference to only a corresponding slice region of another combined picture different from the combined picture, the to-be-displayed slice region being among the one or more to-be-displayed slice regions included in the combined picture, and the to-be-displayed slice region having a reference relationship only with the corresponding slice region which corresponds to the to-be-displayed slice region and is among one or more to-be-displayed slice regions included in the other combined picture.

* * * * *